(12) United States Patent
Hoshino et al.

(10) Patent No.: US 8,041,822 B2
(45) Date of Patent: Oct. 18, 2011

(54) SERVICE NETWORK SYSTEM AND SERVER DEVICE

(75) Inventors: Kazuyoshi Hoshino, Tokyo (JP); Tadashi Kaji, Yokohama (JP); Osamu Takata, Tokyo (JP); Takahiro Fujishiro, Yokohama (JP); Kohei Sawada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1141 days.

(21) Appl. No.: 11/417,054

(22) Filed: May 4, 2006

(65) Prior Publication Data
US 2006/0288120 A1    Dec. 21, 2006

(30) Foreign Application Priority Data

May 11, 2005    (JP) ................................. 2005-138082

(51) Int. Cl.
*G06F 15/16*    (2006.01)
(52) U.S. Cl. ....................................... 709/227; 709/238
(58) Field of Classification Search .................. 709/228, 709/229, 238, 227, 242–244, 250; 713/153–158; 718/105
See application file for complete search history.

(56) References Cited

U.S. PATENT DOCUMENTS

| | | | | |
|---|---|---|---|---|
| 6,112,248 A * | 8/2000 | Maciel et al. | ................. | 709/238 |
| 6,374,300 B2 * | 4/2002 | Masters | ......................... | 709/229 |
| 6,564,261 B1 * | 5/2003 | Gudjonsson et al. | ......... | 709/227 |
| 6,658,473 B1 * | 12/2003 | Block et al. | ................... | 709/226 |
| 6,785,715 B2 * | 8/2004 | Mizuno | ......................... | 709/213 |
| 6,862,623 B1 * | 3/2005 | Odhner et al. | ................ | 709/226 |
| 6,941,384 B1 * | 9/2005 | Aiken et al. | .................. | 709/250 |
| 6,954,784 B2 * | 10/2005 | Aiken et al. | .................. | 709/220 |
| 6,963,917 B1 * | 11/2005 | Callis et al. | ................... | 709/227 |
| 6,965,930 B1 * | 11/2005 | Arrowood et al. | ............ | 709/223 |
| 7,685,298 B2 * | 3/2010 | Day et al. | ...................... | 709/229 |
| 2002/0038425 A1 * | 3/2002 | Kanno | .......................... | 713/185 |
| 2003/0126441 A1 * | 7/2003 | Laux et al. | .................... | 713/168 |
| 2005/0050317 A1 * | 3/2005 | Kramer et al. | ................ | 713/155 |
| 2006/0095501 A1 * | 5/2006 | Mochida | ....................... | 709/203 |
| 2008/0086564 A1 * | 4/2008 | Putman et al. | ................ | 709/227 |
| 2008/0320136 A1 * | 12/2008 | Holt et al. | ..................... | 709/224 |
| 2009/0282149 A1 * | 11/2009 | Kumbalimutt et al. | ........ | 709/226 |

FOREIGN PATENT DOCUMENTS

| | | |
|---|---|---|
| JP | 10-177552 | 6/1998 |
| JP | 2002-108840 | 4/2002 |
| JP | 2003-099402 | 4/2003 |
| JP | 2003-108537 | 4/2003 |
| JP | 2003-124926 | 4/2003 |

(Continued)

OTHER PUBLICATIONS

RFC 3261.

(Continued)

*Primary Examiner* — Ario Etienne
*Assistant Examiner* — Sargon Nano
(74) *Attorney, Agent, or Firm* — Antonelli, Terry, Stout & Kraus, LLP.

(57) ABSTRACT

A server device that represents a plurality of service provision servers implements authentication and a SIP message exchange with respect to a SIP server as a representative, and notifies a service provision server of client communication information that is acquired by the SIP message exchange. The service provision server communicates with a client on the basis of the client communication information that is notified from the representative server.

4 Claims, 28 Drawing Sheets

FOREIGN PATENT DOCUMENTS

| | | |
|---|---|---|
| JP | 2003-178028 | 6/2003 |
| JP | 2003-209560 | 7/2003 |
| JP | 2003-242119 | 8/2003 |
| JP | 2004-529584 | 9/2004 |
| WO | WO 02/097458 | 12/2002 |

OTHER PUBLICATIONS

RFC 2246.

RFC 2327.

F. Lindholm, Key Management Extensions for SDP and RTSP.

* cited by examiner

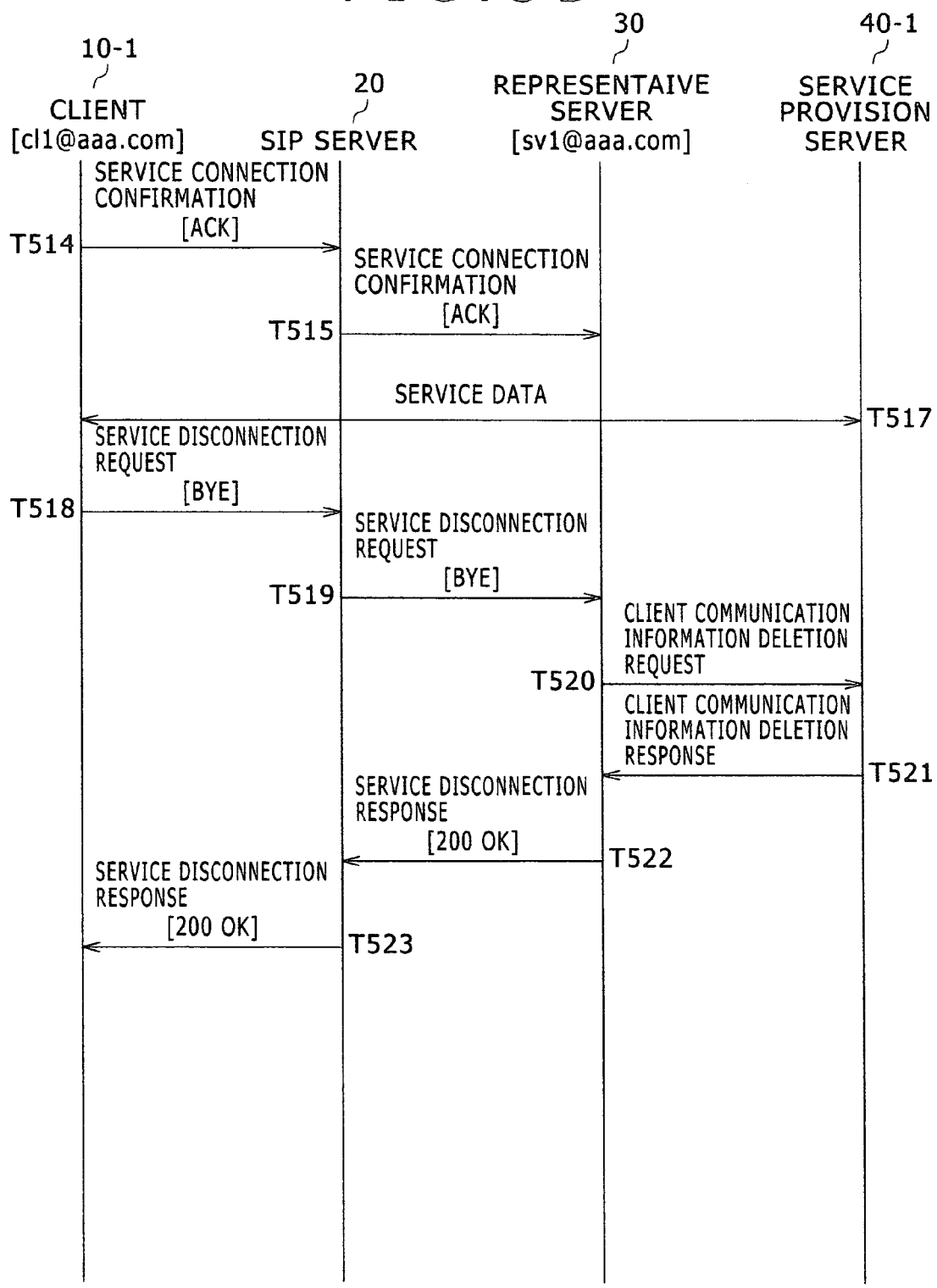

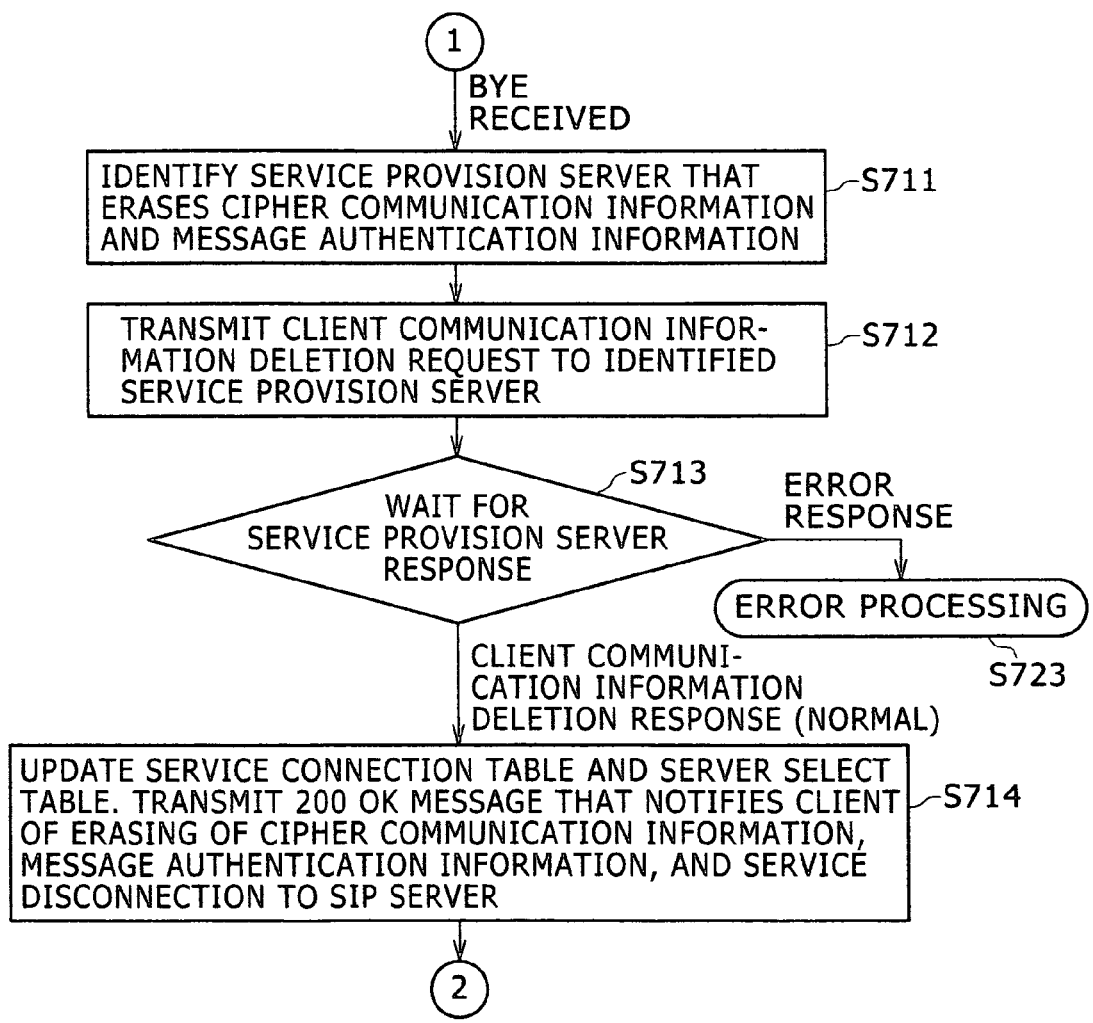

FIG.9

| SERVICE PROVISION SERVER NO. | NUMBER OF CLIENT CONNECTIONS | RESPONSE TIME |
|---|---|---|
| SERVICE PROVISION SERVER 1 | 2 | 250ms |
| SERVICE PROVISION SERVER 2 | 5 | 500ms |
| ..... | | ..... |
| | | |

FIG.10

| SERVICE PROVISION SERVER NO. | CIPHER ALGORITHM | MESSAGE AUTHENTICATION ALGORITHM |
|---|---|---|
| SERVICE PROVISION SERVER 1 | 3DES-CBC<br>AES-CBC-128 | HMAC-MD5<br>HMAC-SHA1 |
| SERVICE PROVISION SERVER 2 | AES-CBC-256 | HMAC-SHA1 |
| ..... | ..... | ..... |
| | | |

F I G. 11

| Call-ID | FROM | TO | CONNECTED SERVER |
|---|---|---|---|
| a84b4c76e66710 | <sips:cl1@aaa.com> :tag=1928301774 | <sips:sv1@aaa.com> :tag=a6c85cf | SERVICE PROVISION SERVER 2 |
| ga9523d0c46eca | <sips:cl2@aaa.com> :tag=278375935 | <sips:sv1@aaa.com> :tag=cd517a47 | SERVICE PROVISION SERVER 1 |
| ..... | ..... | ..... | ..... |
|  |  |  |  |
|  |  |  |  |

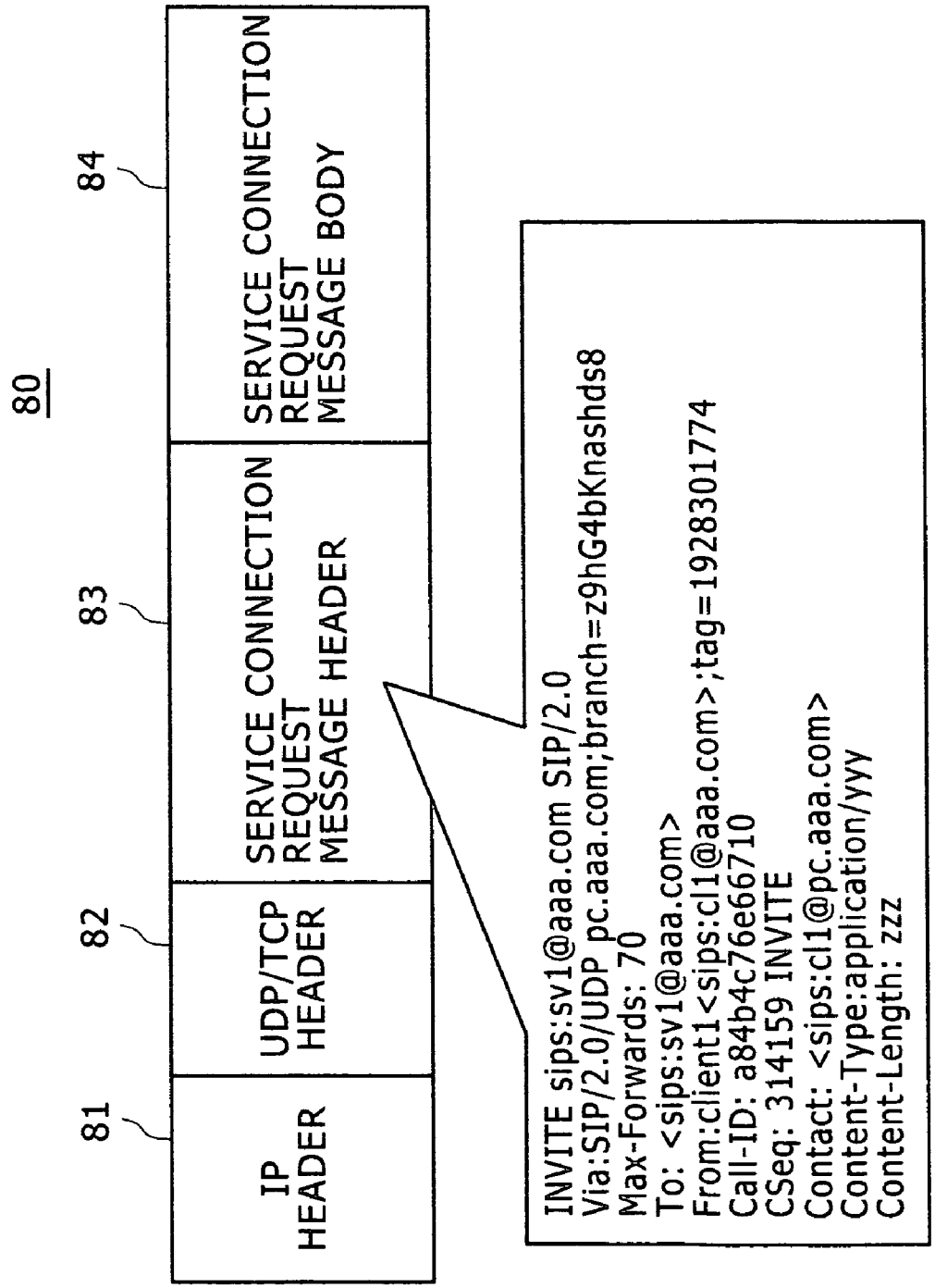

| SETTING ITEM | SETTING VALUE |
|---|---|
| CLIENT IP ADDRESS | 192.0.2.1 |
| CLIENT PORT NO. | 32461 |
| CLIENT COMMUNICATION INFORMATION ID (I) | 124c6d54f21 |
| MESSAGE AUTHENTICATION CODE | HMAC-SHA1 |
| AUTHENTICATION CODE COMMON KEY | 3541e2af1537fg3712ca12 |
| CLIENT COMMUNICATION INFORMATION ID (I) | 342e672fd0 |
| MESSAGE AUTHENTICATION CODE | HMAC-MD5 |
| AUTHENTICATION CODE COMMON KEY | fe648c578b80a675 |
| MESSAGE ENCRYPTING METHOD | AES-128-CBC |
| CIPHER COMMON KEY | 1653fe648c578b424ef |
| APPLICATION INFORMATION | MEDIA TYPE, TRANSPORT, PROTOCOL, FORMAT, ETC. |

841 — SETTING ITEM column
842 — SETTING VALUE column

CLIENT COMMUNICATION INFORMATION OPTION 1 (rows: CLIENT COMMUNICATION INFORMATION ID (I), MESSAGE AUTHENTICATION CODE, AUTHENTICATION CODE COMMON KEY)

CLIENT COMMUNICATION INFORMATION OPTION 2 (HAVING CIPHER) (rows: CLIENT COMMUNICATION INFORMATION ID (I), MESSAGE AUTHENTICATION CODE, AUTHENTICATION CODE COMMON KEY, MESSAGE ENCRYPTING METHOD, CIPHER COMMON KEY)

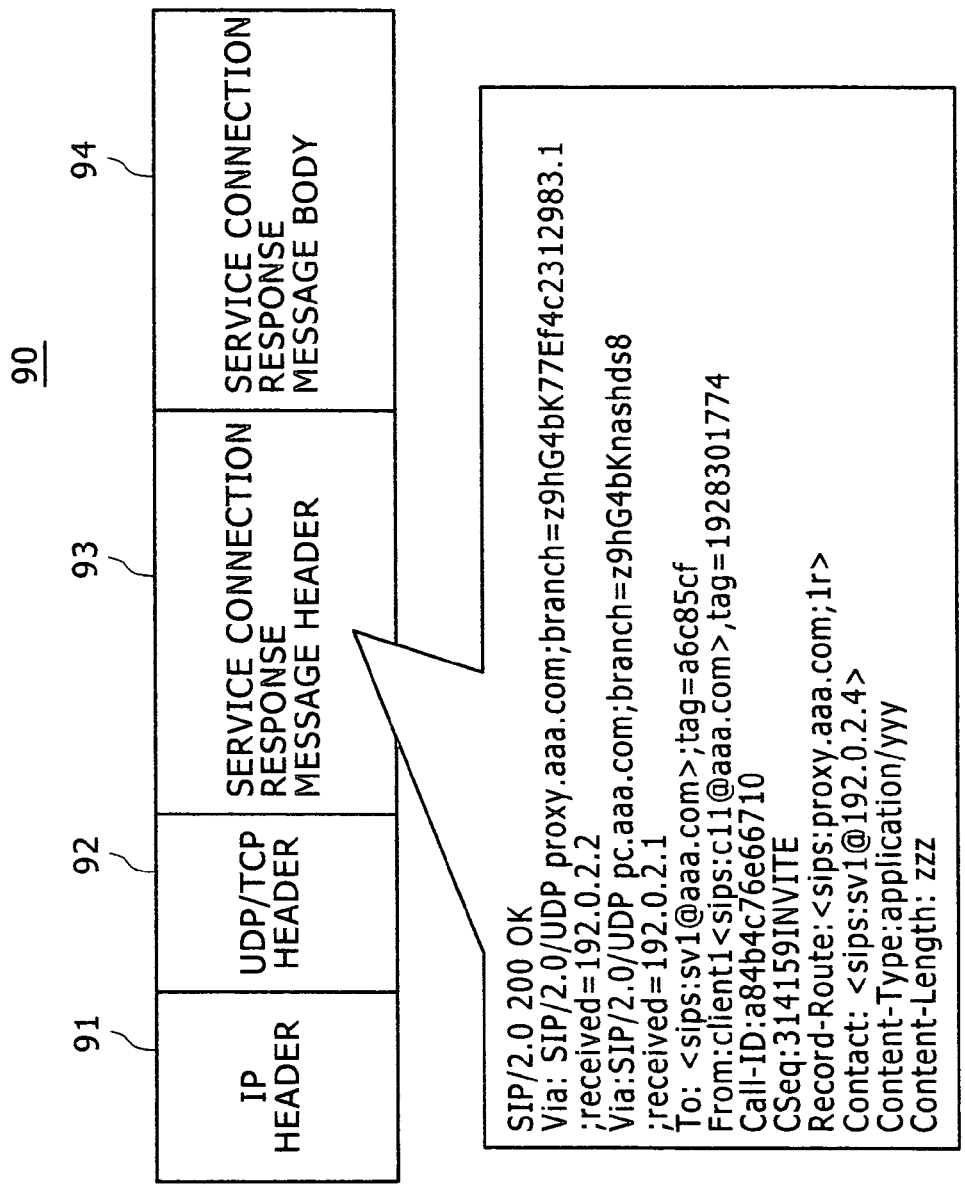

F I G . 15

94

| SETTING ITEM | SETTING VALUE |
|---|---|
| SERVICE PROVISION SERVER IP ADDRESS | 192.0.2.3 |
| SERVICE PROVISION SERVER PORT NO. | 58465 |
| CLIENT COMMUNICATION INFORMATION ID (R) | 104c2e2f1 |
| MESSAGE AUTHENTICATION CODE | HMAC-SHA1 |
| AUTHENTICATION CODE COMMON KEY | 3541e2af1537fg3712ca12 |
| APPLICATION INFORMATION | MEDIA TYPE, TRANSPORT, PROTOCOL, FORMAT, ETC. |

941 (SETTING ITEM column), 942 (SETTING VALUE column)

SELECTED CLIENT COMMUNICATION INFORMATION: Client Communication Information ID (R), Message Authentication Code, Authentication Code Common Key

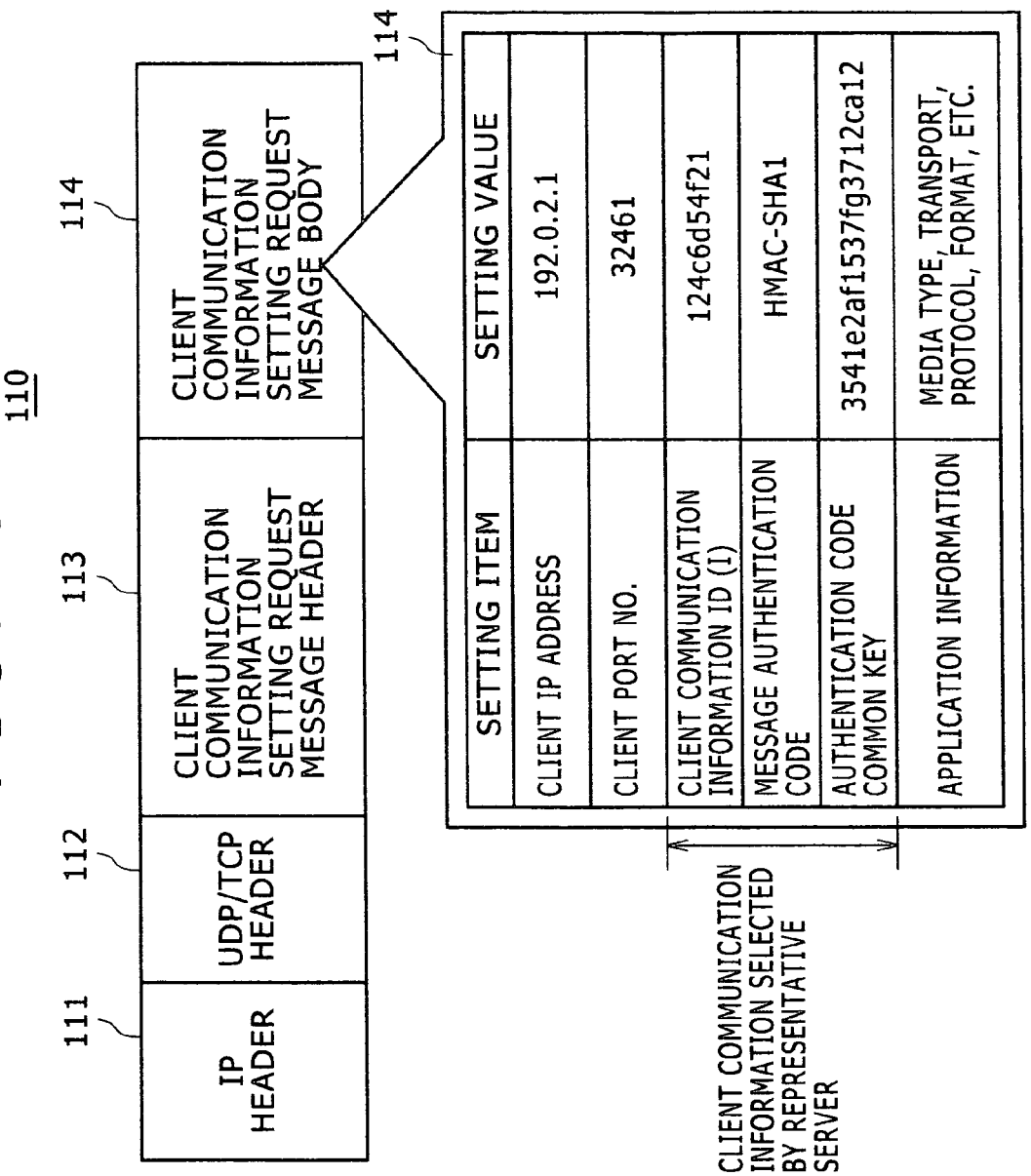

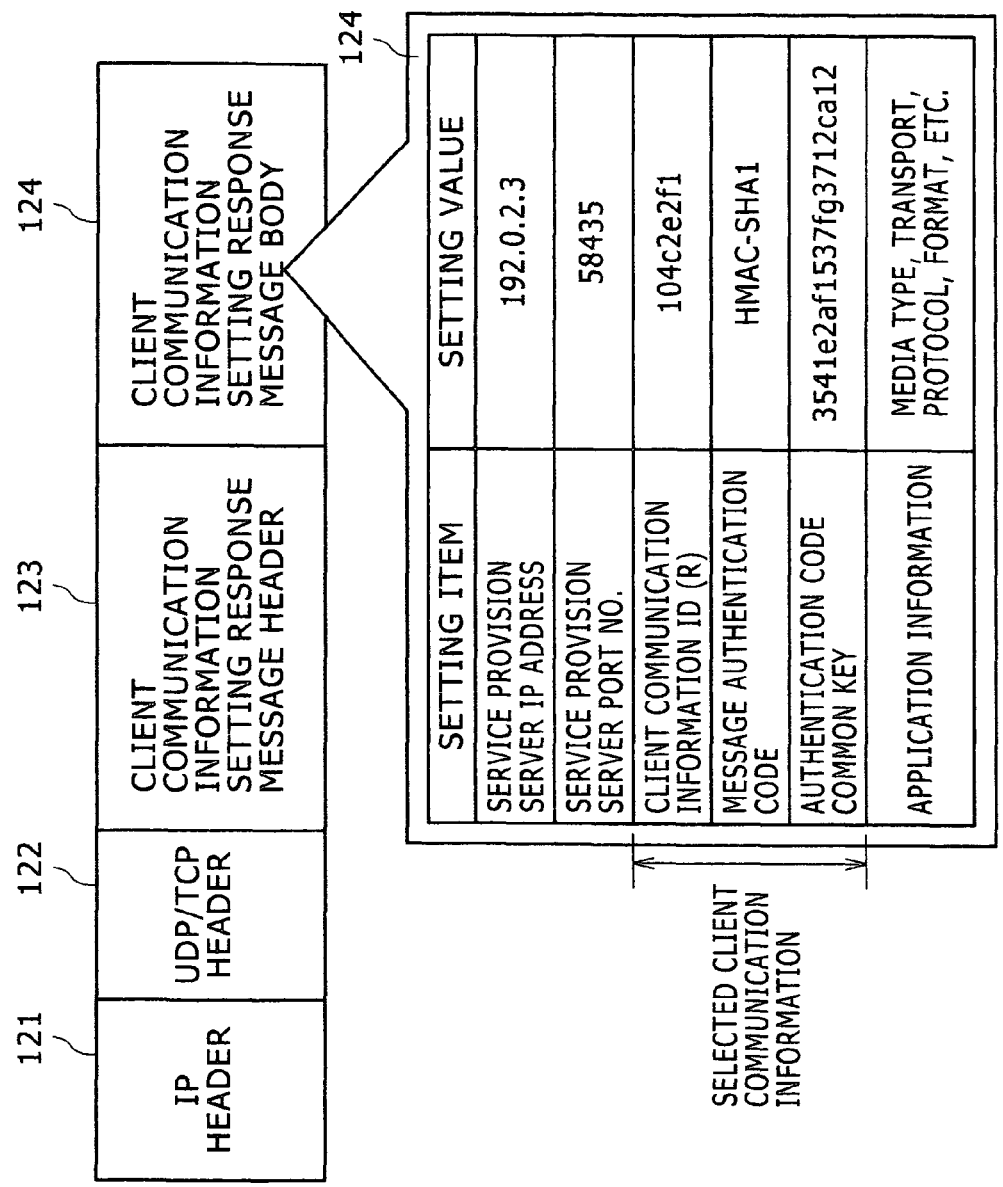

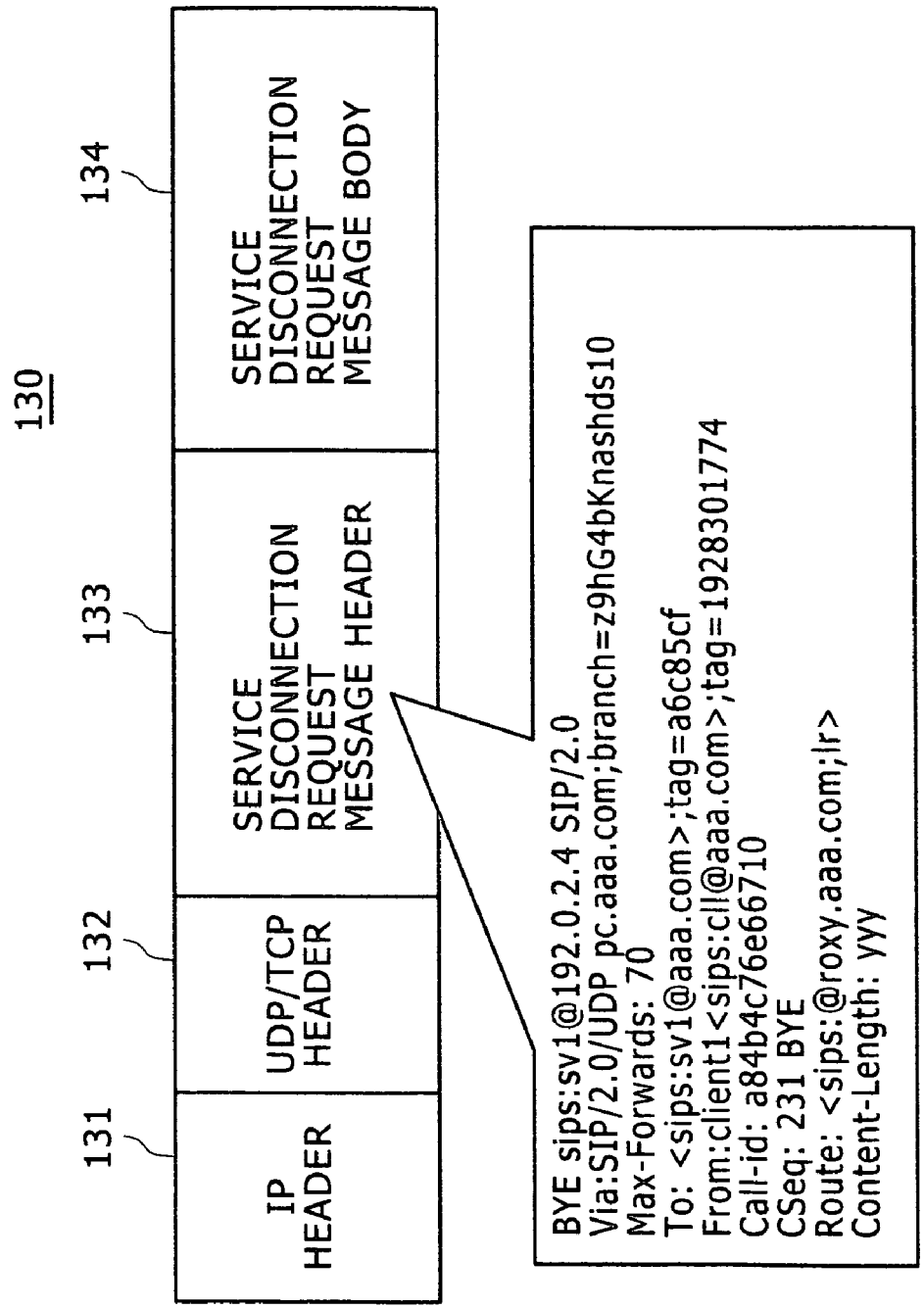

| SETTING ITEM | SETTING VALUE |
|---|---|
| CLIENT IP ADDRESS | 192.0.2.1 |
| CLIENT PORT NO. | 32461 |
| CLIENT COMMUNICATION INFORMATION ID (I) | 124c6d54f21 |

1341, 1342

CLIENT COMMUNICATION INFORMATION TO BE DELETED

FIG. 21

| SETTING ITEM | SETTING VALUE |
|---|---|
| SERVICE PROVISION SERVER IP ADDRESS | 192.0.2.3 |
| SERVICE PROVISION SERVER PORT NO. | 58435 |
| CLIENT COMMUNICATION INFORMATION ID (R) | 104c2e2f1 |

CLIENT COMMUNICATION INFORMATION TO BE DELETED

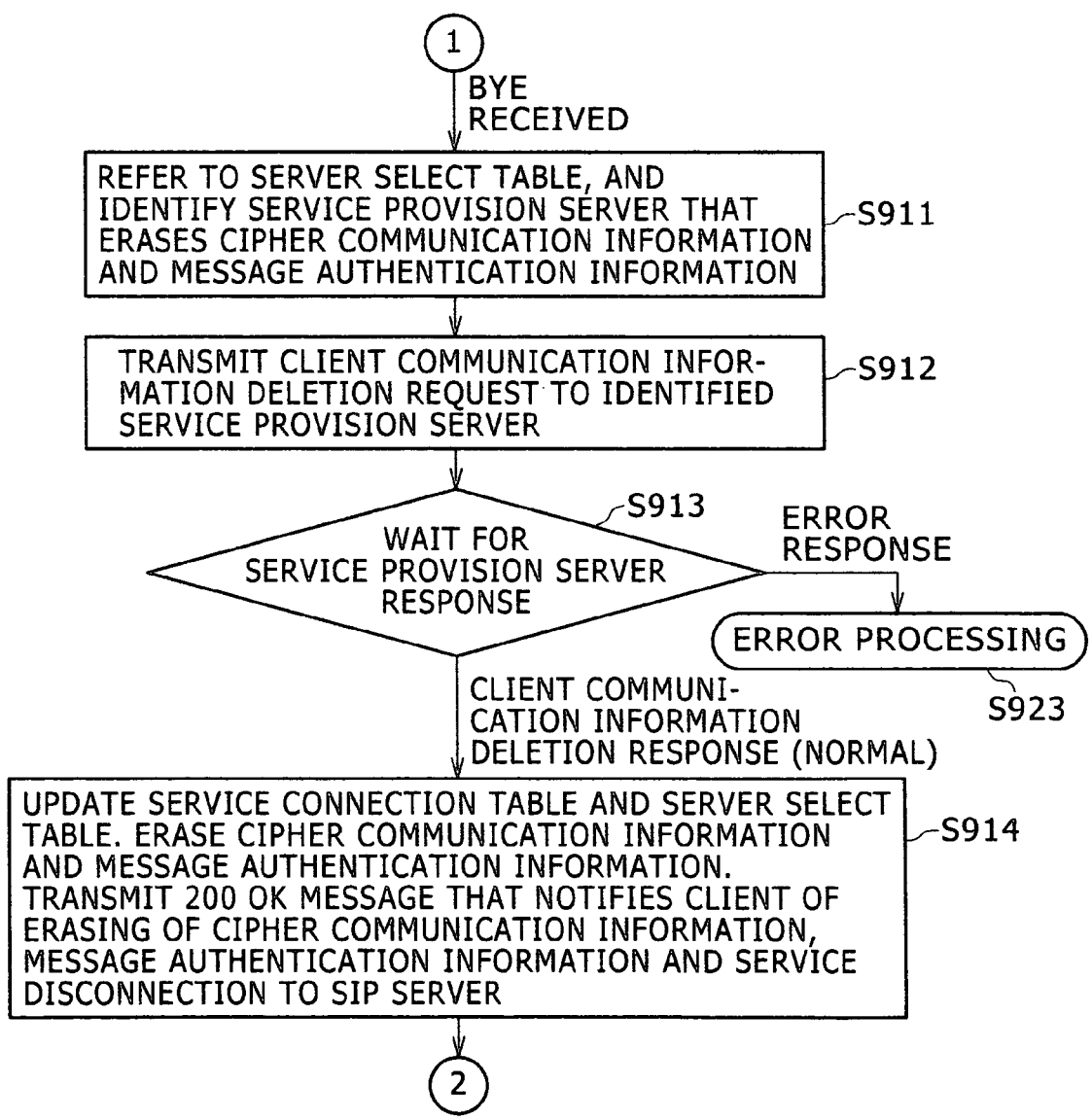

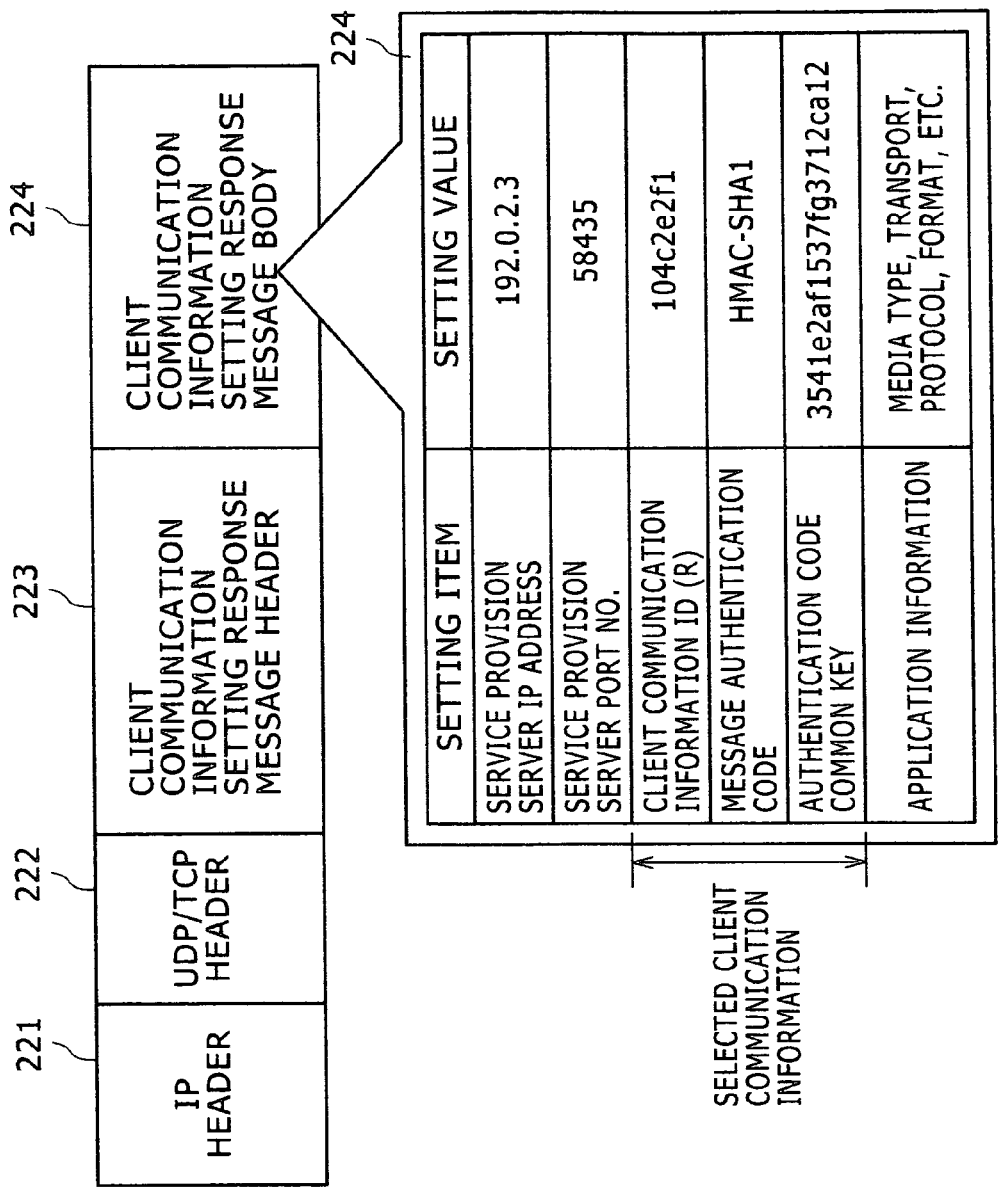

SERVICE NETWORK SYSTEM AND SERVER DEVICE

CLAIM OF PRIORITY

The present application claims priority from Japanese patent application serial no. 2005-138082, filed on May 11, 2005, the content of which is hereby incorporated by reference into this application.

BACKGROUND OF THE INVENTION

The present invention relates to a service network system and a server device, and more particularly to a service network system and a server device taking load reduction of a SIP server into consideration.

JP 2002-108840A discloses a technique by which a receive server receives a connection request as a representative of plural contents servers, and notifies a client of information on a permissible ticket as well as the contents server to be connected. Also, JP 2003-108537A discloses a technique by which a window server receives a connection request as a representative of plural service servers, and notifies a client of information on a service server to be connected.

JP 2003-209560A and JP 2003-178028A disclose a technique by which a SIP (session initiation protocol) is used as a protocol of communication start, and user authentication is conducted by the server. JP 2003-242119A, JP 10-177552A, and JP 2003-099402A disclose a technique by which no SIP is used as the protocol of communication start, but a representative authentication server that conducts authentication in block is provided.

RFC3261, RFC2246, RFC2327, and "Key Management Extensions for SDP and RTSP" written by F. Lindholm disclose an IETF (internetw engineering task force) standards related to the SIP. RFC3261 is related to an RFC (request for comment) of the SIP, and discloses a method of conducting the authentication of the user and the encryption of the TLS message by TLS (transport layer security). RFC2246 discloses the RFC related to the TLS. RFC2327 discloses an RFC related to a method of describing session information (SDP: session description protocol) that is transmitted or received by the SIP. "Key Management Extensions for SDP and RTSP" discloses a method of exchanging key information that is used for encrypting communication data by SDP or RTSP (Real Time Streaming Protocol).

In the case where a service provider provides a service by using a plurality of service provision servers, it is necessary to acquire and install an electronic certificate in each of the service provision servers. Also, when the service provision servers communicate with the SIP server, individually, it is necessary that the SIP server holds communication session information in each of the service provision servers. As a result, a processing load increases.

In the technique that is disclosed in JP 2002-108840A or JP 2003-108537, communication of the receive server or a window server with a client is conducted by an HTTP (hypertext transportation protocol), and the SIP is not considered. JP 2003-209560A discloses a method of acquiring an IP address of the server to be connected by a client.

JP 2003-178028A discloses a technique by which a management server that is connected to a network, and an authentication server that is connected to the management server are provided, and a terminal at a data supply side is logged in a terminal at a date request side. JP 2003-242119A or JP 10-177552A discloses that an authentication server receives a service connection request from a client as a representative server, but service provision is conducted through the authentication server with the result that the authentication server becomes a bottleneck. JP 2003-099402A discloses an authentication representative server, which merely requests authentication from a communication carrier server instead of a service provider.

As described above, the techniques that are disclosed in patent documents described above do not provide means for solving the problem to be solved by the invention even by the single document or the combination thereof. There is proposed a structure in which a load dispersion device that conducts the authentication and encryption is located upstream of the service provision server. In this case, the load dispersion device becomes a bottle neck of processing.

SUMMARY OF THE INVENTION

A server device that represents plural service provision servers implements SIP server authentication or SIP message exchange as a representative, and notifies a service provision server of client communication information (encrypted communication information, message authentication information) that is acquired by the SIP message exchange. The service provision server communicates with a client on the basis of the client communication information that is notified from the representative server.

BRIEF DESCRIPTION OF THE DRAWINGS

These and other objects and advantages of this invention will become more fully apparent from the following detailed description taken with the accompanying drawings wherein:

FIG. 5B is a transition diagram for explaining the communication of the client, the SIP server, the representative server, and the service provision server with each other according to the first embodiment (No. 2);

FIG. 7B is a diagram for explaining a processing flow of the representative server according to the first embodiment (No. 2);

FIG. 9 is a diagram for explaining a server selection table provided by the service provision server according to the first embodiment;

FIG. 10 is a diagram for explaining a communication setting table provided by the representative server according to the first embodiment;

FIG. 11 is a diagram for explaining a service connection table provided by the representative server according to the first embodiment;

FIG. 12 is a diagram for explaining a configuration of a service connection request addressed to a SIP server from a client and a message header according to the first embodiment;

FIG. 13 is a diagram for explaining a message body of the service connection request addressed to the SIP server from the client according to the first embodiment;

FIG. 14 is a diagram for explaining a configuration of a service connection response addressed to the SIP server from the representative server and a message header according to the first embodiment;

FIG. 15 is a diagram for explaining a message body of the service connection request addressed to the SIP server from the client according to the first embodiment;

FIG. 16 is a diagram for explaining a configuration of a client communication information setting request addressed to the service provision server from the representative server and a message body according to the first embodiment;

FIG. 17 is a diagram for explaining a configuration of a client communication information setting response addressed to the representative server from the service provision server and a message body according to the first embodiment;

FIG. 18 is a diagram for explaining a configuration of a service disconnection request addressed to the SIP server from the client and a message header according to the first embodiment;

FIG. 19 is a diagram for explaining a message body of a service disconnection request addressed to the SIP server from the client according to the first embodiment;

FIG. 21 is a diagram for explaining a message body of a service disconnection response addressed to the SIP server from the representative server according to the first embodiment;

FIG. 26B is a flowchart showing the processing of a representative server according to the second embodiment (No. 2);

FIG. 29 is a diagram for explaining a configuration of a client communication information setting response addressed to the representative server from the service provision server and a message body according to the second embodiment.

DETAILED DESCRIPTION OF THE PREFERRED EMBODIMENTS

Hereinafter, a description will be given in more detail of the embodiments of the present invention with reference to the accompanying drawings.

First Embodiment

Figure 1:
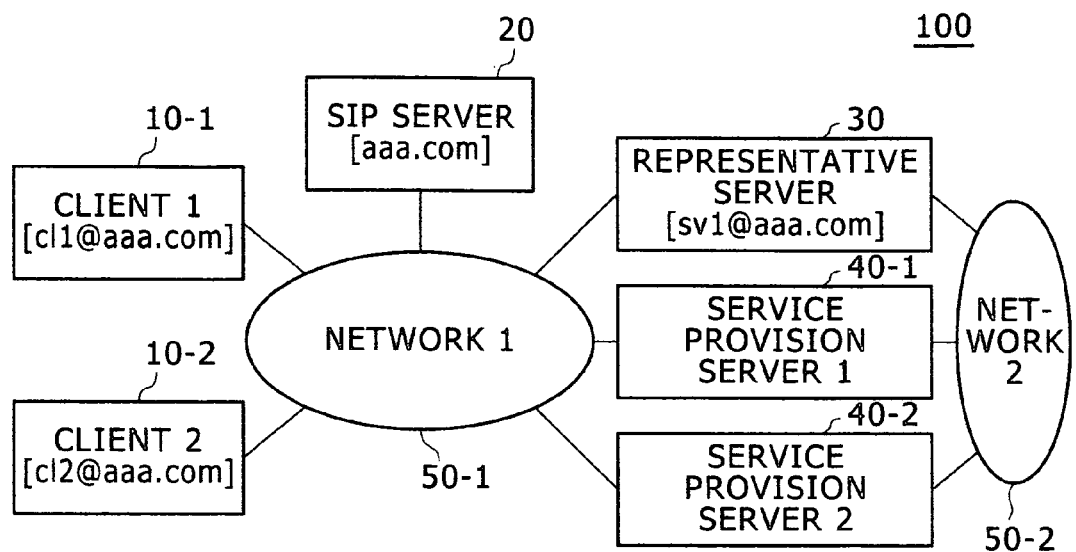
FIG. 1 is a block diagram for explaining a system configuration according to a first embodiment.
Figure 2:
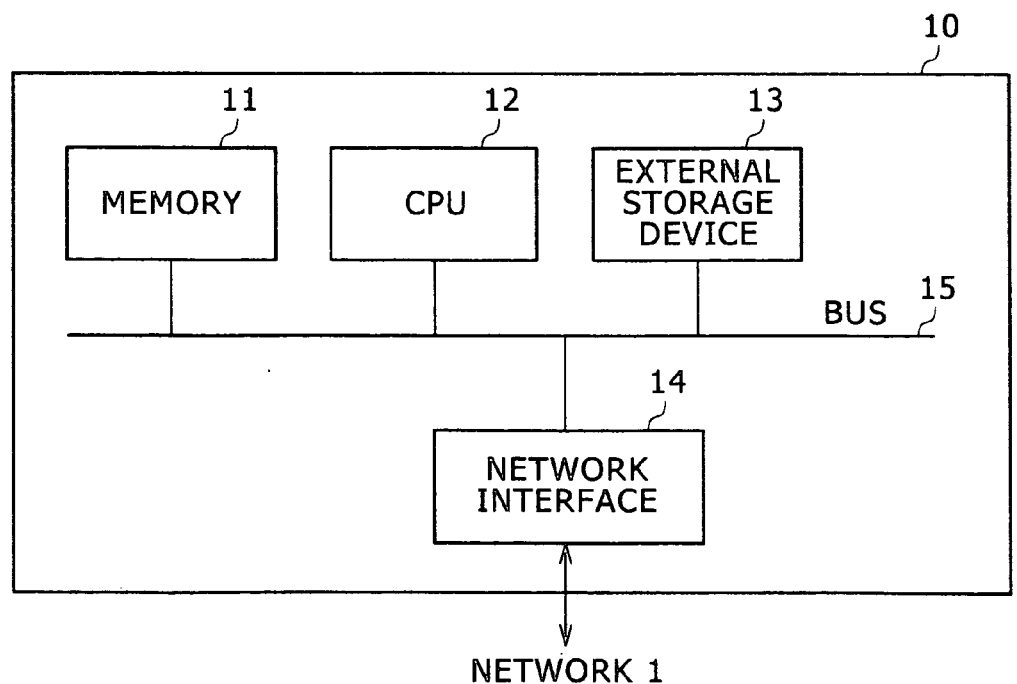
FIG. 2 is a block diagram for explaining a client hardware configuration according to the first embodiment.
Figure 3:
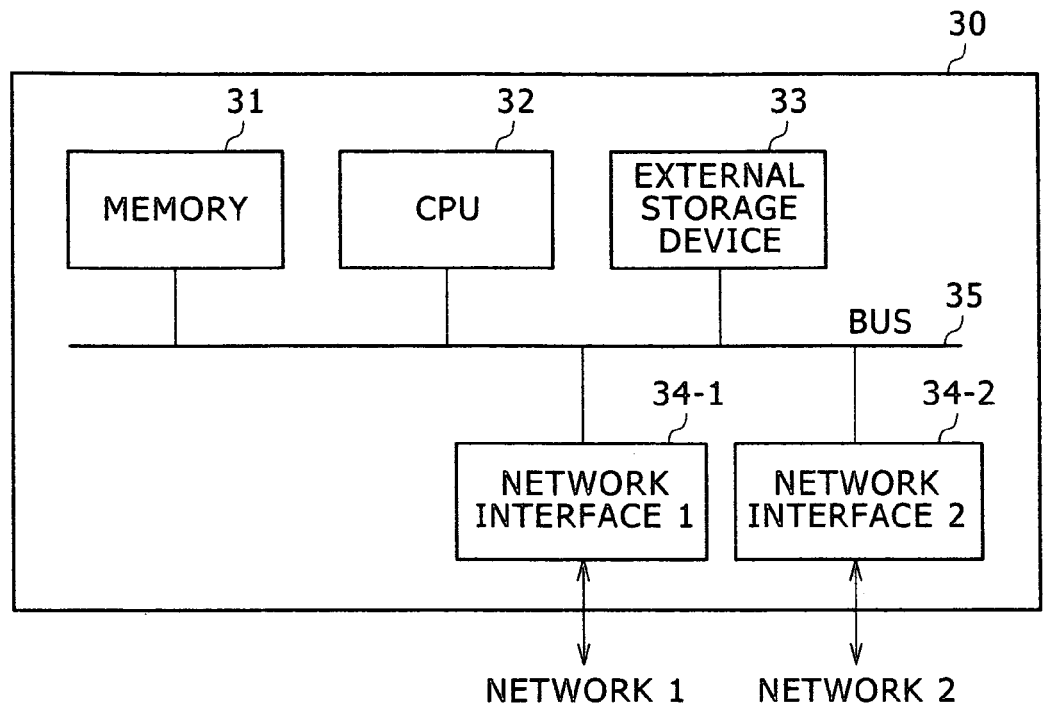
FIG. 3 is a block diagram for explaining a hardware configuration of the representative server according to the first embodiment.
Figure 4:
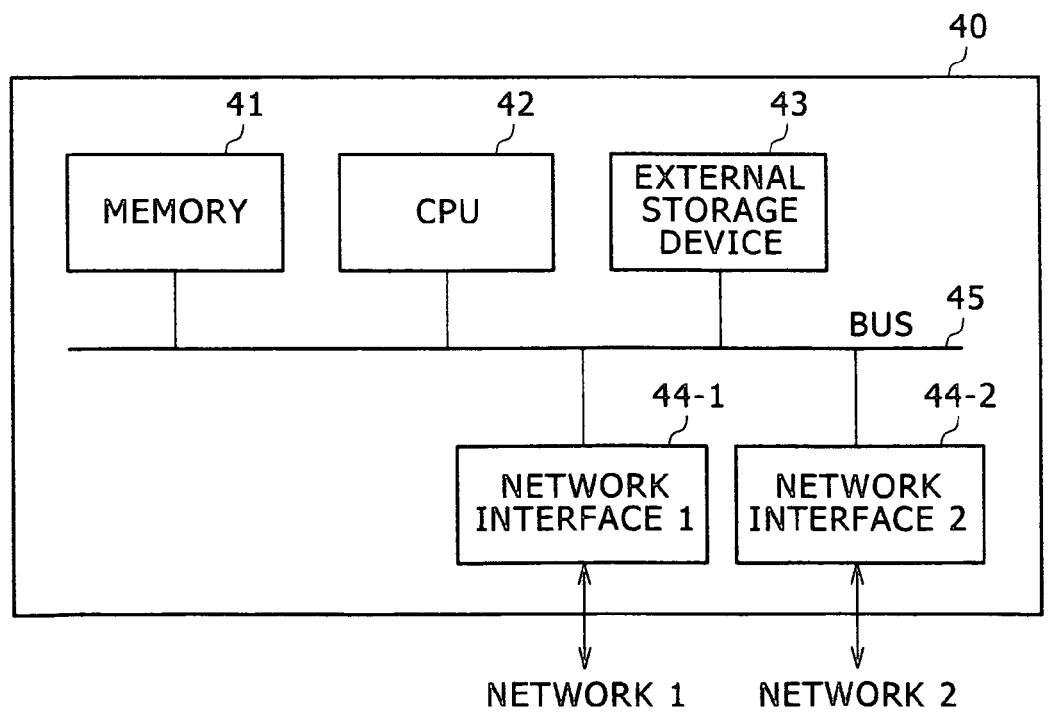
FIG. 4 is a block diagram for explaining a hardware configuration of the service provision server according to the first embodiment.
Figure 5A:
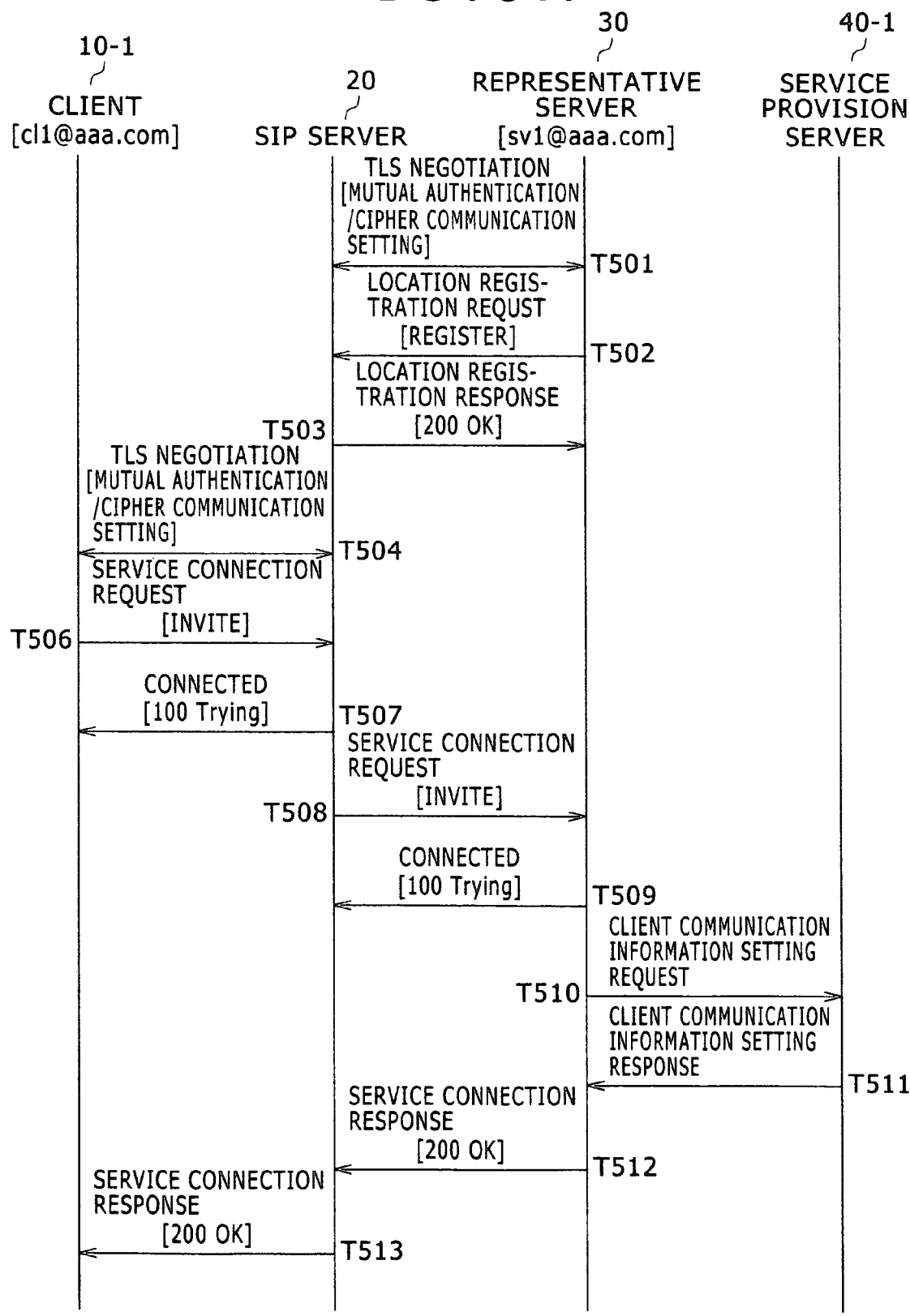
FIG. 5A is a transition diagram for explaining a communication of the client, the SIP server, the representative server, and the service provision server with each other according to the first embodiment (No. 1)
Figure 6:
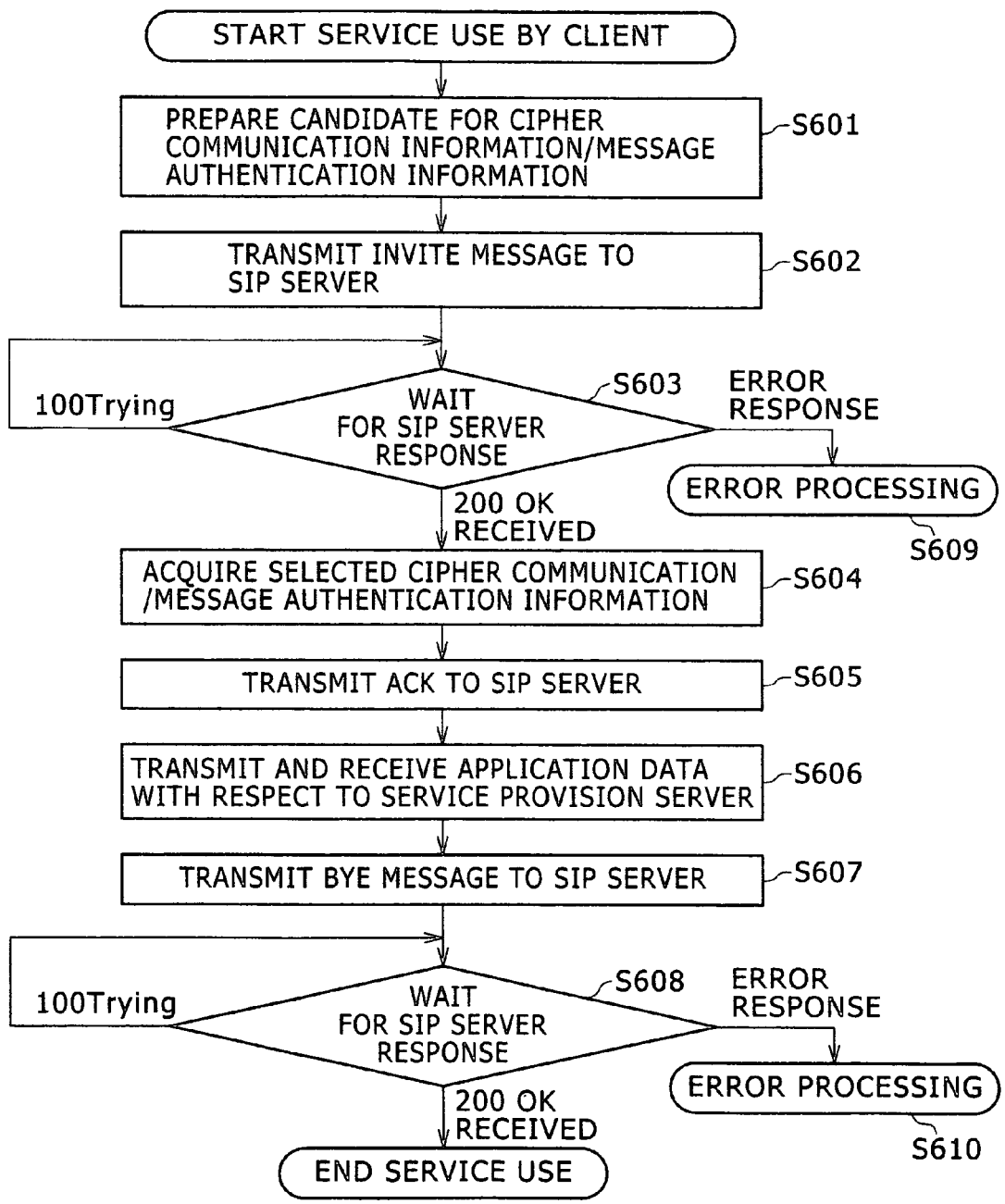
FIG. 6 is a diagram for explaining a processing flow of the client according to the first embodiment.
Figure 7A:
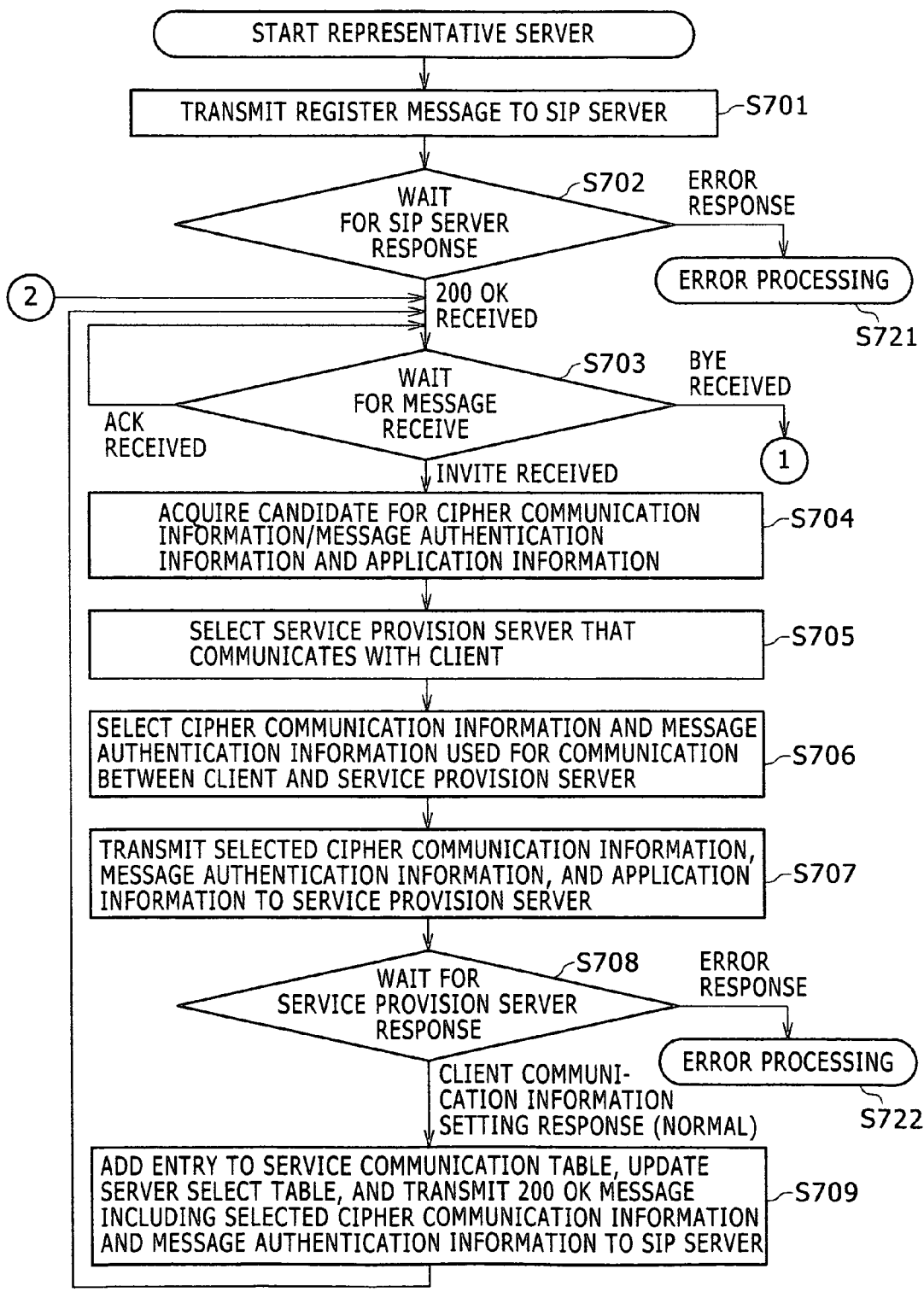
FIG. 7A is a diagram for explaining a processing flow of the representative server according to the first embodiment (No. 1)
Figure 8:
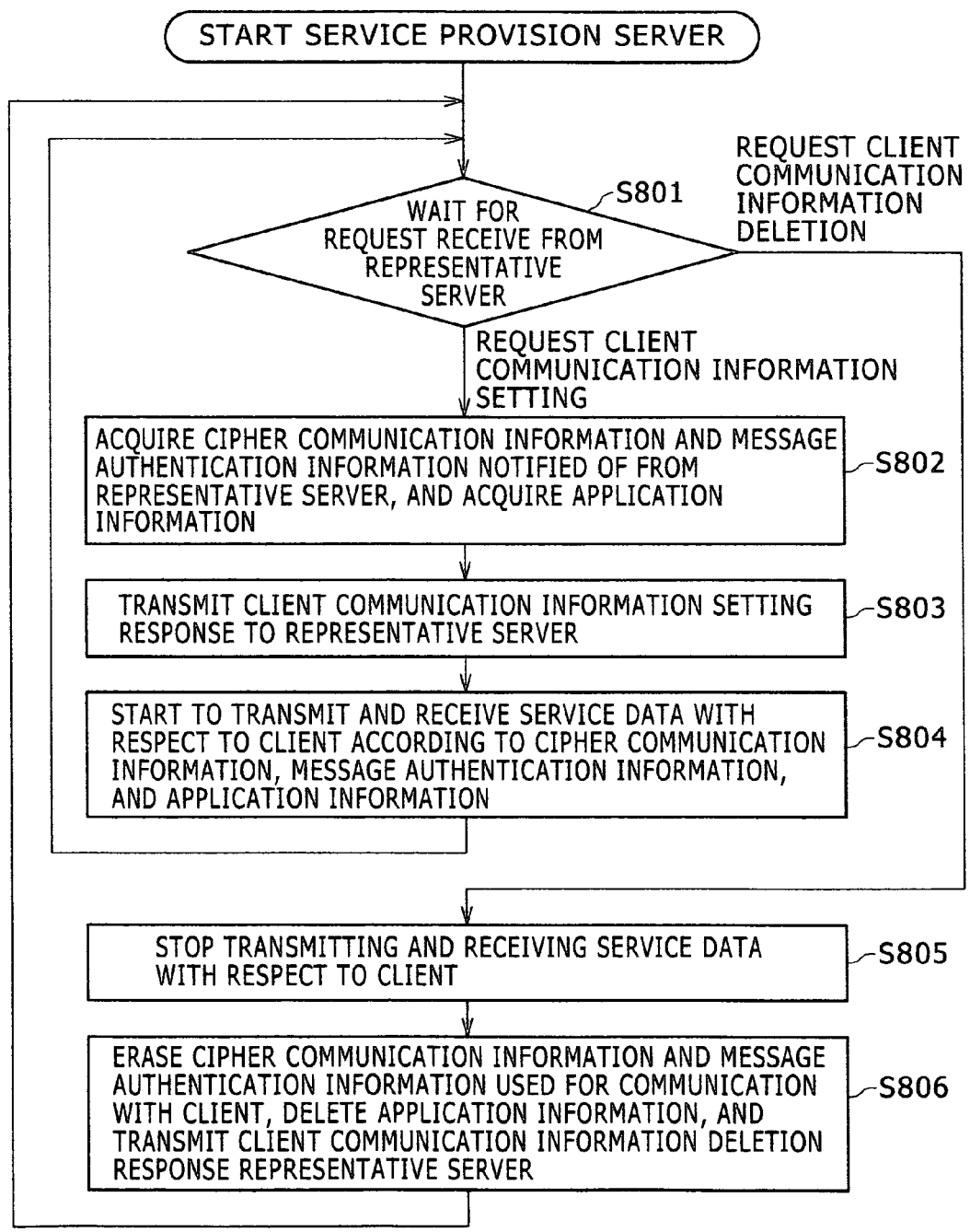
FIG. 8 is a flowchart for explaining processing of the service provision server according to the first embodiment.

A first embodiment of the present invention will be described with reference to FIGS. 1 to 25. FIG. 1 is a block diagram for explaining a system configuration. FIG. 2 is a block diagram for explaining a client hardware configuration. FIG. 3 is a block diagram for explaining a hardware configuration of the representative server. FIG. 4 is a block diagram for explaining a hardware configuration of the service provision server. FIG. 5A is a transition diagram for explaining a communication of the client, the SIP server, the representative server, and the service provision server with each other. FIG. 5B is a transition diagram for explaining the communication of the client, the SIP server, the representative server, and the service provision server with each other. FIG. 6 is a diagram for explaining a processing flow of the client. FIG. 7A is a diagram for explaining a processing flow of the representative server. FIG. 7B is a diagram for explaining a processing flow of the representative server. FIG. 8 is a flowchart for explaining processing of the service provision server. FIG. 9 is a diagram for explaining a server selection table provided by the service provision server. FIG. 10 is a diagram for explaining a communication setting table provided by the representative server. FIG. 11 is a diagram for explaining a service connection table provided by the representative server.

Figure 20:
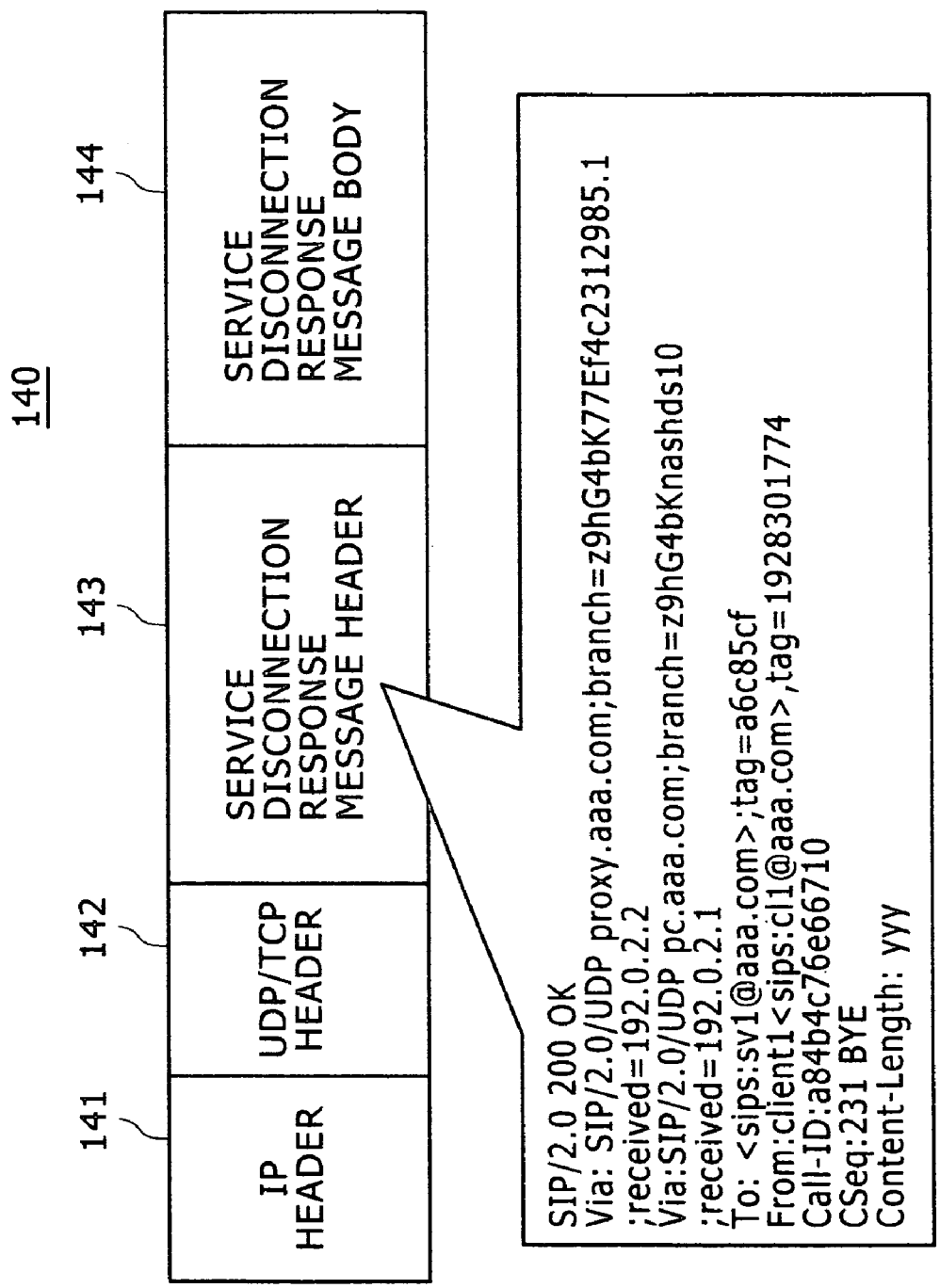
FIG. 20 is a diagram for explaining a configuration of a service disconnection response addressed to the SIP server from the representative server and a message header according to the first embodiment.
Figure 22:
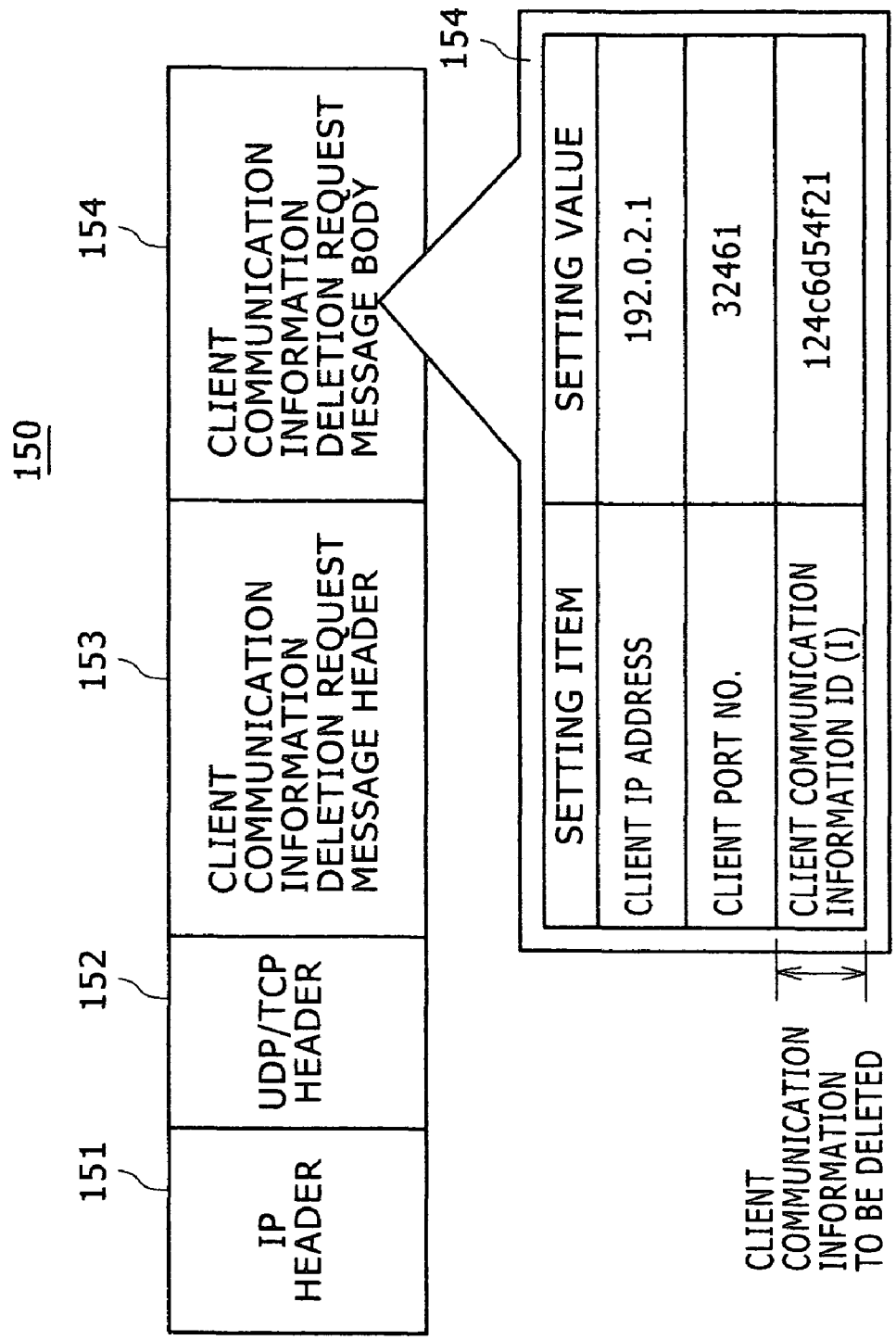
FIG. 22 is a diagram for explaining a configuration of a client communication information deletion request addressed to the service provision server from the representative server and a message body according to the first embodiment.
Figure 23:
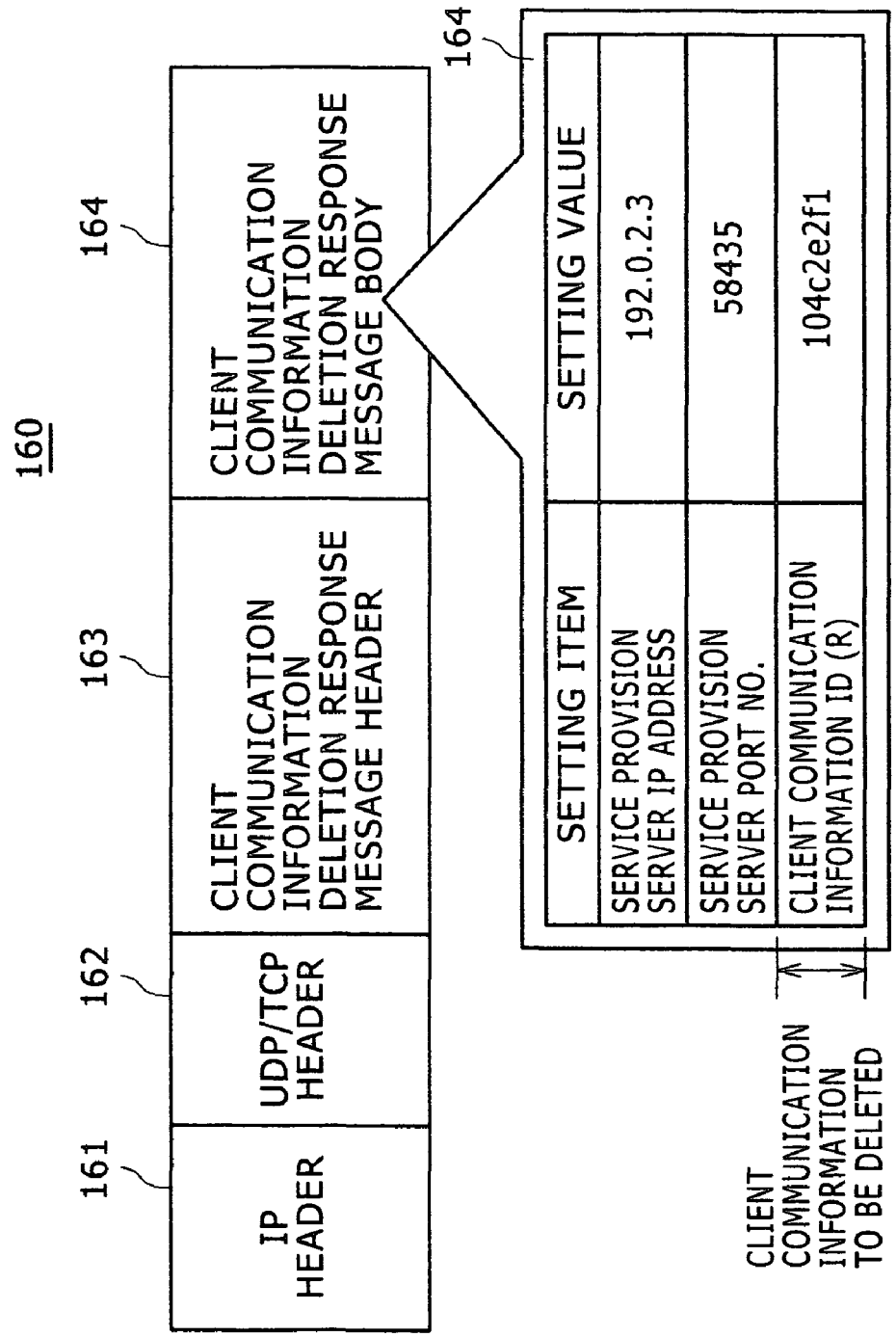
FIG. 23 is a diagram for explaining a configuration of a client communication information deletion response addressed to the representative server from the service provision server and a message body according to the first embodiment.
Figure 24:
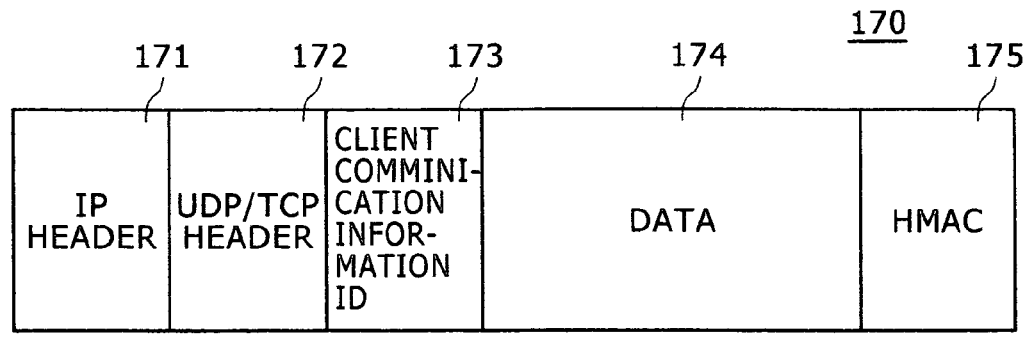
FIG. 24 is a diagram for explaining a configuration of data that is communicated between the service provision server and the client according to the first embodiment.
Figure 25:
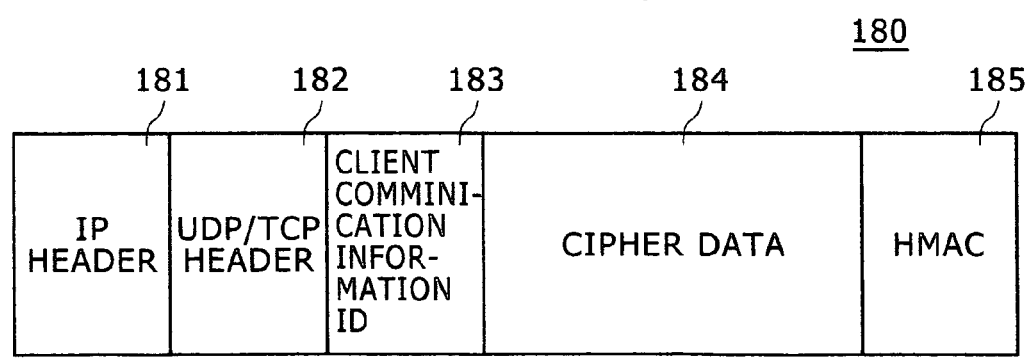
FIG. 25 is a diagram for explaining a configuration of encrypted data that is communicated between the service provision server and the client according to the first embodiment.

FIG. 12 is a diagram for explaining a configuration of a service connection request addressed to a SIP server from a client and a message header. FIG. 13 is a diagram for explaining a message body of the service connection request addressed to the SIP server from the client. FIG. 14 is a diagram for explaining a configuration of a service connection response addressed to the SIP server from the representative server and a message header. FIG. 15 is a diagram for explaining a message body of the service connection request addressed to the SIP server from the client. FIG. 16 is a diagram for explaining a configuration of a client communication information setting request addressed to the service provision server from the representative server and a message body. FIG. 17 is a diagram for explaining a configuration of a client communication information setting response addressed to the representative server from the service provision server and a message body. FIG. 18 is a diagram for explaining a configuration of a service disconnection request addressed to the SIP server from the client and a message header. FIG. 19 is a diagram for explaining a message body of a service disconnection request addressed to the SIP server from the client. FIG. 20 is a diagram for explaining a configuration of a service disconnection response addressed to the SIP server from the representative server and a message header. FIG. 21 is a diagram for explaining a message body of a service disconnection response addressed to the SIP server from the representative server. FIG. 22 is a diagram for explaining a configuration of a client communication information deletion request addressed to the service provision server from the representative server and a message body. FIG. 23 is a diagram for explaining a configuration of a client communication information deletion response addressed to the representative server from the service provision server and a message body. FIG. 24 is a diagram for explaining a configuration of data that is communicated between the service provision server and the client. FIG. 25 is a diagram for explaining a configuration of encrypted data that is communicated between the service provision server and the client.

In a service network system 100 shown in FIG. 1, a network 50-1 is connected with a plurality of clients 10 (10-1, 10-2, . . . ), a session management server (hereinafter referred to as "SIP server") 20 having a session management function, a representative server 30, and a plurality of service provision servers 40 (40-1, 40-2, . . . ). The representative server 30 and the service provision server 40 are also connected to a network 50-2. The service provision server 40 includes an instant message server, a content distribution server that supplies various contents information to a client, and a conference call server that supports a conference call among a plurality of clients.

The letter strings that are attached to the respective clients 10 and the representative servers 30 and put in the parentheses indicate the device addresses that are used by IP packets which are transferred on the network 50-1. Each of those addresses partially includes an address "aaa.com" of the SIP server 20, by which it is found that those terminals and the representative server belong to the SIP server 20. The connection (setting of the session) and the disconnection (end of the session) between each of the clients 10 and the representative server 30 are conducted through the SIP server 20. In the following description, it is assumed that the IP address is the client 1 [cl1@aaa.com]: 192.0.2.1, the SIP server: 102.0.2.2, the service provision server 1: 192.0.2.3, and the representative server [sv1@aaa.com]: 192.0.2.4.

The network 50-1 is used to communicate between the client and the representative server and between the client and the service provision server. On the other hand, the network 50-2 is a server in-room LAN, and used to communicate between the representative server 30 and the service provision servers 40. The reason why the network 50-1 and the network 50-2 are separated from each other is to protect confidential information such as a message authentication parameter which is transmitted or received between the representative server 30 and the service provision servers 40. In the case where the encrypted communication is conducted between the representative server 30 and the service provision servers 40, the representative server 30 and the service provision servers 40 may conduct a communication by using the network 50-1.

A configuration of the client will be described with reference to FIG. 2. The client 10 is made up of a processor (CPU) 12, a memory 11 that temporarily stores various programs which are executed by the processor 12 and various tables to which the programs refer therein, an external storage device 13 that saves the various programs and the various tables to which the programs refer, and a network interface 14 that is connected to the network 50-1, which are connected to a bus 15.

The representative server 30 shown in FIG. 3 is made up of a processor (CPU) 32, a memory 31 that temporarily stores various programs which are executed by the processor 32 and various tables to which the programs refer therein, an external storage device 33 that saves the various program and the various tables to which the programs refer therein, a network interface 34-1 that is connected to the network 50-1, and a network interface 34-2 that is connected to the network 50-2, which are connected to a bus 35. In the hardware configuration of the representative server, the network 50-1 and the network 50-2 are physically separated from each other, and an access is conducted by using the individual network interfaces 34-1 and 34-2. However, the network 50-1 and the network 50-2 are logically separated from each other by setting a router or a firewall, thereby making it possible to take an access to both of the network 50-1 and the network 50-2 from one network interface.

The service provision server 40 shown in FIG. 4 is identical in the configuration with the representative server described with reference to FIG. 3. That is, the service provision server 40 is made up of a processor (CPU) 42, a memory 41 that temporarily stores various programs which are executed by the processor 42 and various tables to which the programs refer therein, an external storage device 43 that saves the various program and the various tables to which the programs refer therein, a network interface 44-1 that is connected to the network 50-1, and a network interface 44-2 that is connected to the network 50-2, which are connected to a bus 45. It is possible to take an access to both of the network 50-1 and the network 50-2 from one network interface.

Referring to FIGS. 5A and 5B, the mutual authentication and the encrypted communication setting are first conducted by a TLS negotiation that is disclosed in RFC 3261 between the SIP server 20 and the representative server 30 (T501: called "SIP server authentication"). Subsequently, a REGISER request (REGISTER message) that is a SIP request that registers its own location is transmitted to the SIP server 20 from the representative server 30 (T502). The SIP server 20 transmits 200 OK that is a SIP response code indicative of the normal completion to the representative server 30 after having registered the location of the representative server 30 described in the received REGISTER request (T503). It is necessary that the REGISTER message is implemented by the receive side (invited side).

On the other hand, the mutual authentication and the encrypted communication setting are conducted between the client 10-1 and the SIP server 20 by the TLS negotiation (T504). When the INVITE request that is a service connection request is transmitted to the SIP server 20 from the client 10-1 (T506), the SIP server 20 transmits 100 Trying indicative of on-connection to the client 10-1 (T507), and then transfers the INVITE request to the representative server 30 (T508). The representative server 30 transmits 100 Trying to the SIP server 20 (T509), and then transmits a client communication information setting request to the service provision server 40-1 (T510).

The service provision server 40-1 receives the client communication information setting request, and sends back the client communication information setting response to the representative server 30 (T511). The representative server 30 that has received the client communication information setting response transmits 200 OK that is a service connection response to the SIP server 20 (T512). The SIP server 20 that has received the 200 OK transmits 200 OK to the client 10-1, likewise (T513).

The client 10-1 that has received 200 OK which is a service connection response transmits an ACK request which is a SIP request of the service connection confirmation to the SIP server 20 (T514). The SIP server 20 that has received the ACK request transmits the ACK request to the representative server 30 (T515). Since the service provision server 40-1 and the client 10-1 replace the respective IP addresses and port Nos. with each other, the service provision server 40-1 and the client 10-1 are connected directly to each other to start the transmit/receive of the service data (T517).

When a BYE request that is a SIP request of the service disconnection request is transmitted to the SIP server 20 from the client 10-1 (T518), the SIP server 20 that has received the BYE request then transmits the BYE request to the representative server 30 (T519). The representative server 30 that has received the BYE request transmits a client communication information deletion request to the service provision server 40-1 (T520). The service provision server 40-1 that has received the communication information deletion request transmits the communication information deletion response to the representative server 30 (T521), and the representative server 30 that has received the communication information deletion response transmits a 200 OK that is a service disconnection response to the SIP server 20 (T522). The SIP server 20 that has received the 200 OK transmits the 200 OK that is a service disconnection response to the client (T523). With the above operation, the communication is completed. A communication between the representative server 30 and the service provision server 40 is conducted through the network 50-2 shown in FIG. 1, and other communications are conducted through the network 50-1.

Subsequently, the operation of the client, the representative server, and the service provision server will be described below. Referring to FIG. 6, the client 10 produces a candidate for encrypted communication information which is used for a direction communication with the service provision server, and a candidate for message authentication information (S601). The client 10 transmits an INVITE message that sets those candidates in a body to the SIP server 20 (S602). Thereafter, the client 10 waits for a response from the SIP server (S603), and upon receiving a 200 OK that is a service connection response from the SIP service 20, the client 10 analyzes the 200 OK message, and acquires the selected encrypted communication information and message authentication information (S604).

After the client 10 transmits the ACK message that is a service connection confirmation request to the SIP server 20 (S605), the client 10 transmits and receives application data with respect to the service provision server 40 by using the selected encrypted communication information and message authentication information (S607).

The client 10 then transmits a BYE message that sets an erasing request of the message authentication information in a body to the SIP server 20 (S607). Thereafter, the client 10 waits for a response from the SIP server (S608), and completes the service use upon receiving the 200 OK that is the service disconnection response from the SIP server 20. When the client 10 receives an error or times out in Steps 603 or 608, the operation is transited to error processing in Step 609 or Step 610.

Referring to FIGS. 7A and 7B, when the representative server 30 starts, the representative server 30 transmits a REGISTER message that sets the IP address (location) of the representative server 30 as contact information to the SIP server 20 (S701), and waits for a response from the SIP server 20 (S702). When the representative server 30 receives a 200 OK that is a location registration response from the SIP server 20, the representative server 30 waits for a message receive (S703). When the representative server 30 receives an INVITE message from the SIP server 20, the representative server 30 analyzes the INVITE message and acquires the encrypted communication information candidate, the message authentication information candidate, and the application information (S704). Thereafter, the representative server 30 refers to a server selection table (which will be described later with reference to FIG. 9) that records a status of the service provision server therein, and selects the service provision server 40-1 that communicates directly with the client (S705).

The representative server 30 refers to a communication setting table (which will be described later with reference to FIG. 10) that registers the encrypted communication information and message authentication information which are usable by the service provision server 40-1 therein, and selects the encrypted communication information and the message authentication information which are used for a communication between the client 10 and the service provision server 40 (S706). Then, the representative server 30 transmits the selected encrypted communication information and message authentication information as well as the application information to the select service provision server 40-1 as the client communication information setting request (S707), and waits for a response from the service provision server 40-1 (S708).

When the client communication information setting response indicative of a fact that the communication has been normally conducted is returned to the representative server 30 from the service provision server 40-1, the representative server 30 adds an entry to the service connection cable (which will be described later with reference to FIG. 11), and updates the server selection table. Also, the representative server 3 transmits the 200 OK message including the selected encrypted communication information and message authentication information to the SIP server 20 (S709), and again waits for the message receive (S703).

Upon receiving the ACK message from the SIP server 20 that is the service connection confirmation, the representative server 30 again waits for the message (S703). In this situation, upon receiving a BYE message that is the service disconnection request from the SIP server 20, the representative server 30 analyzes the BYE message, refers to the server selection table, and identifies the service provision server 40-1 that erases the encrypted communication information and the message authentication information (S711). Then, the representative server 30 transmits a client communication information deletion request to the service provision server 40-1 (S712), and waits for a response from the service provision server 40-1 (S713). When the client communication information deletion response indicative of the fact that the communication has been normally conducted is returned from the service provision server 40-1, the representative server 30 deletes the entry of the service connection table, and updates the server selection table. Also, the representative server 30 transmits a 200 OK message that notifies the client of the erasing of the message authentication information and the disconnection of the service to the SIP server 20 (S714), and waits for the message receive (S703). When the representative server 30 receives an error or times out in Steps 703, 708 or 713, the operation is transited to the error processing in Steps 721, 722 or 723.

Referring to FIG. 8, when the service provision server 40 starts, the service provision server 40 first waits for a request receive from the representative server 30 (S801). Upon receiving the client communication information setting request, the service provision server 40 analyzes the client communication information setting request from the representative server 30, and acquires the encrypted communication information, the message authentication information, and the application information (S802). The service provision server 40 sets the encrypted communication information, the message authentication information, and the application information in the client communication information setting table, and then transmits a client communication information setting response to the representative server 30 (S803). Thereafter, the service provision server 40 starts to transmit and receive the service data directly with respect to the client according to the encrypted communication information, the message authentication information, and the application information. At a timing of this start, the service provision server 40 transits to waiting for the request receive from the representative server 30 even during transmitting or receiving the service data (S801).

Upon receiving a client communication information processing request, the service provision server 40 analyzes the request, and stops transmitting and receiving the service data with respect to the client (S805). The service provision server 40 erases the encrypted communication information, the message authentication information, and the application information which are used for the communication with the client from the client communication information setting table. Then, the service provision server 40 transmits a client communication deletion response to the representative server 30 (S806), and again transits to waiting for the request receive from the representative server 30 (S801).

A server selection table shown in FIG. 9 is a table that is recorded in the external storage device 33 of the representative server 30. A server selection table 50 is made up of a service provision server number 51, the number of client connections 52, and a response time 53. When the representative server 30 receives a new service request, the representative server 30 refers to the server selection table 50, and selects a service provision server that is small in the response time (that is, low in the load) among the service provision servers under the control.

A communication setting table shown in FIG. 10 is a table that is recorded in the external storage device 33 of the representative server 30 as with the server selection table. A communication setting table 60 is made up of a service provision server number 61, an encrypted algorithm 62 that can be communicated by the service provision server, and a message authentication algorithm 63 that can be authenticated by the service provision server. When the representative server 30 receives a new service request, the representative server 30 refers to the communication setting table 60, and selects the encrypted algorithm and the message authentication algorithm which are adapted to the service provision server that is selected from the options submitted by the client. When the selected service provision server does not adapt to those algorithms, the service provision server is changed.

A service connection table shown in FIG. 11 is a table that is recorded in the external storage device 33 of the representative server 30 as with the server selection table and the communication setting table. The service connection table 70 describes a Call-ID 71 that is sent from the client, a From 72 that is an address of the client, a To 73 that is a destination address of the request, and the service provision server that is a connected server 74 selected by the representative server. The tag described in the from 72 and the To 73 is identification information of the address.

A service connection request packet 80 from the client to the SIP server as shown in FIG. 12 is a packet that is sent by T506 in FIG. 5. The service connection request packet 80 is made up of an IP header 81, a UDP/TCP header 82, a service connection request message header 83, and a service connection request message body 84. The service connection request message header 83 includes a connection request message of the SIP which is defined by RFC3261. The SDP that is specified by RFC3266 is applied to the session description of the SIP.

The service connection request message header 83 includes "INVITE" indicating that the message is intended for the session connection request in a start line as a request method. The service connection request message header 82 also includes URI sv1@aaa.com of the representative server in the start line as the destination address.

An address of the client that is an originator is described in a Via header. A to header and a From header indicate the destination and the originator, respectively, and a Call-ID is indicative of a session identifier that is designated by the originator. A Cseq header is a Command Sequence and identifies a transaction within the session. A Contact header is indicative of URI of the client 10-1 to be registered in the SIP server, and a Content-Type header and a Content-Length are indicative of the definition information on the SDP of the message body 84.

The service request packet body 84 from the client to the SIP server as shown in FIG. 13 is a table made up of a setting item 841 and a setting value 842. The setting item 841 is made up of a client IP address, a client port number, a client communication information option 1 having no data encryption, a client communication information option 2 that implements data encryption, and the application information. The corresponding setting values of those information are described in the setting value 842. The client communication information option 1 is made up of a client communication information ID(I), a message authentication code, and an authentication code common key. The client communication information ID(I) is an ID that associates data that has been transmitted by the Initiator with the authentication code and the key. The client communication information option 2 is made up of the client communication information ID (I), the message authentication code, the authentication code common key, a message encrypting method, and an encryption common key. The client communication information ID (I) is an ID that associates the data that has been transmitted by the Initiator with the message authentication code and the encryption common key. A service connection request packet 80 from the client to the SIP server is transferred to the representative server 30 from the SIP server.

A service connection response packet 90 from the representative server to the SIP server as shown in FIG. 14 is a packet that is transmitted by T512 in FIG. 5. The service connection response packet 90 is made up of an IP header 91, a UDP/TCP header 92, a service request message header 93, and a service connection response message body 94. The service connection response message header 93 includes a connection response message of the SIP.

The service connection response message header 93 includes "200 OK" which indicates that the message is intended for the session response in a start line as a request method. Since the Call-ID header and the Cseq header are the same as the connection request shown in FIG. 12, it is understood that those headers are the connection response (permission) to the connection request. A To header and a From header are indicative of a destination and an originator of the connection request, respectively, as they are.

A service response packet body 94 from the common server to the SIP server as shown in FIG. 15 is a table made up of a setting item 941 and a setting value 942. The setting item 941 is made up of a client IP address, a client port number, a client communication information that is selected by the representative server, and application information. The corresponding setting values of those information are described in the setting value 942. The selected client communication information is made up of a client communication information ID(R), a message authentication code, and an authentication code common key. The client communication information ID(R) is an ID that associates the data that has been transmitted by a Responder with the authentication code and the key. The service connection response packet 90 from the representative server to the SIP server is transferred from the SIP server to the client 10-1.

A client communication information setting request packet from the representative server to the service provision server as shown in FIG. 16 is a packet that is transmitted by T510 in FIG. 5. The client communication information setting request packet 110 is made up of an IP header 111, a UDP/TCP header 112, a client communication information setting request message header 113, a client communication information setting request message body 114. The client communication information setting request message body 114 is the same as the service connection request message body described with reference to FIG. 13, from which the client communication information option 2 that has not been selected by the representative server 30 is except. The client communication information setting request message body 114 is held in the service provision server 40 as the client communication information setting table.

A client communication information setting response packet from the service provision server to the representative server as shown in FIG. 17 is a packet that is transmitted by T511 in FIG. 5. The client communication information setting response packet 120 is made up of an IP header 121, a UDP/TCP header 122, a client communication information setting response message header 123, a client communication information setting response message body 124. The client communication information setting response message body 124 is the same as the service connection response message body described with reference to FIG. 15. This is because the representative server transfers the message body to the SIP server without changing the message body as it is.

In FIGS. 16 and 17, since a communication between the representative server and the service provision server uses the network 50-2 that is a secure local area network, the protocol may be a protocol such as an HTTP (HyperText Transport Protocol) other than the SIP.

A service disconnection request packet 130 from the client to the SIP server as shown in FIG. 18 is a packet that is sent by T518 in FIG. 5B. The service disconnection request packet 130 is made up of an IP header 131, a UDP/TCP header 132, a service disconnection request message header 133, and a service disconnection request message body 134. The service disconnection request message header 133 includes a disconnection request message of the SIP. The service disconnection request message header 133 includes "BYE" that indicates that the message is intended for the session disconnection request in a start line as a request method, and includes "192.0.2.4" which is an IP address of the service provision server.

A service disconnection request packet body 134 from the client to the SIP server as shown in FIG. 19 is made up of a setting item 1341 and a setting value 1342. The setting item 1341 includes an IP address of the client, a port number, and a client communication information ID. A setting value that is noticed by the service connection request message body (FIG. 13) is set to the setting value of the client communication information ID.

A service disconnection response packet 140 from the representative server to the SIP server as shown in FIG. 20 is a packet that is sent in T522 in FIG. 5. The service disconnection response packet 140 is made up of an IP header 141, a UDP/TCP header 142, a service disconnection response message header 143, and a service disconnection response message body 144. The service disconnection response message header 143 includes a disconnection response message of the SIP. The service disconnection response message header 143 includes "200 OK" which indicates that the message is intended for the session response in a start line as a request method. Since a Call-ID header and a Cseq header are identical with those of the disconnection request shown in FIG. 18, it is understood that they are the disconnection response (permission) to the disconnection request.

A service disconnection response packet body 144 from the representative server to the SIP server as shown in FIG. 21 is made up of a setting item 1441 and a setting value 1442. The setting item 1441 includes an IP address and a port number of the service provision server, and a client communication information ID. The setting value that is noticed by the service connection response message body (FIG. 15) is set to the setting value of the client communication information ID.

A client communication information deletion request packet 150 from the representative server to the service provision server as shown in FIG. 22 is a packet that is sent by T520 in FIG. 5. The client communication information deletion request packet 150 is made up of an IP header 151, a UDP/TCP header 152, a client communication information deletion request message header 153, and a client communication information deletion request message body 154. The client communication information deletion request message body 154 is identical with the service disconnection request message body described with reference to FIG. 19.

A client communication information deletion response packet 160 from the service provision server to the representative server as shown in FIG. 23 is a packet that is sent by T521 in FIG. 5. The client communication information deletion response packet 160 is made up of an IP header 161, a UDP/TCP header 162, a client communication information deletion response message header 163, and a client communication information deletion response message body 164. The client communication information deletion response message body 164 is the same as the service disconnection response message body described with reference to FIG. 21. This is because the representative server transfers the message body to the SIP server without changing the message body as it is.

In FIGS. 22 and 23, since a communication between the representative server and the service provision server uses the network 50-2 that is a secure local area network, the protocol may be a protocol such as an HTTP (HyperText Transport Protocol) other than the SIP.

A packet that is communicated between the client and the service provision server will be described with reference to FIGS. 24 and 25. In this example, FIG. 24 shows a packet that is communicated between the client and the service provision server in the case where the representative server selects the client communication information option 1 that does not encrypt data in the service request messages from the client shown in FIG. 13. Also, FIG. 25 shows a packet that is communicated between the client and the service provision server in the case where the representative server selects the client communication information option 2 that encrypts data in the service request messages from the client shown in FIG. 13.

Referring to FIG. 24, a data packet 170 is made up of an IP header 171, a UDP/TCP header, a client communication information ID 173, data 174, and an HMAC 175. The client communication information ID 173 is made up of a client communication information ID(R) or a client communication information ID(I). In this example, it is assumed that the data packet 170 is streaming data from the service provision server toward the client. The client refers to the client communication information ID(R) that is attached to data, and grasps a message authentication code (HMAC-SHA1) and an authentication code common key (3541e2af1537fg3712ca12) which correspond to the client communication information ID(R) described with respect to FIG. 15. The HMAC 175 is demodulated by using the authentication code common key to generate a hash (1). On the other hand, a hash (2) is generated by using data 174 and the message authentication code. When the hash (1) and the hash (2) are equal to each other, it can be confirmed that the server provision server which is an originator of the data packet 170 is a regular service provision server under the representative server.

Referring to FIG. 25, a data packet 180 is made up of an IP header 181, a UDP/TCP header 182, a client communication information ID 183, an encrypted data 184, and an HMAC 185. In this example, it is assumed that the data packet 180 is a streaming data from the service provision server toward the client. The client refers to the client communication information ID(R) (not shown) which is attached to data, and grasps a message authentication code (HMAC-MD5: refer to FIG. 13), an authentication code common key (fe648c578b80a675), a message encrypting method (AES-128-CBC), and an encryption common key (1653fe648c578b424ef), which correspond to the client communication information ID(R). Then, the HMAC 185 is demodulated by using the authentication code common key to generate the hash (1). On the other hand, the encrypted data 184 is demodulated by the encryption common key, and the hash (2) is generated by using the message authentication code. When the hash (1) and the hash (2) are equal to each other, it can be confirmed that the server provision server which is an originator of the data packet 180 is a regular service provision server under the representative server. In FIGS. 24 and 25, the data packet is data from the data provision server to the client. On the contrary, in the data from the client to the service provision server, likewise, the service provision server refers to the client communication information ID(I) that is attached to data, and compares the generated two hash values with each other, thereby making it possible to confirm that the client is a regular client.

According to this embodiment, because the authentication is conducted on only the representative server, it is unnecessary that the service provision server has an electronic certificate. The client confirms a value of the HMAC that is given the message, thereby making it possible to confirm that the service provision server that conducts the communication is a service provision server under a correct representative server. Also, the encrypted communication makes it possible to keep the confidential property of service data.

It is unnecessary that the SIP server authenticates the individual service provision servers, and also it is unnecessary that the communication session is held between the SIP server and the individual service provision servers. As a result, the load of the SIP server can be reduced. Also, because the data communication is conducted directly between the client and the service provision server, the representative server does not become the bottle neck of processing. In this embodiment, since the representative server selects the client communication information in a lump, there is advantageous in that the client communication information can be decided by one inquiry.

Second Embodiment

Figure 26A:
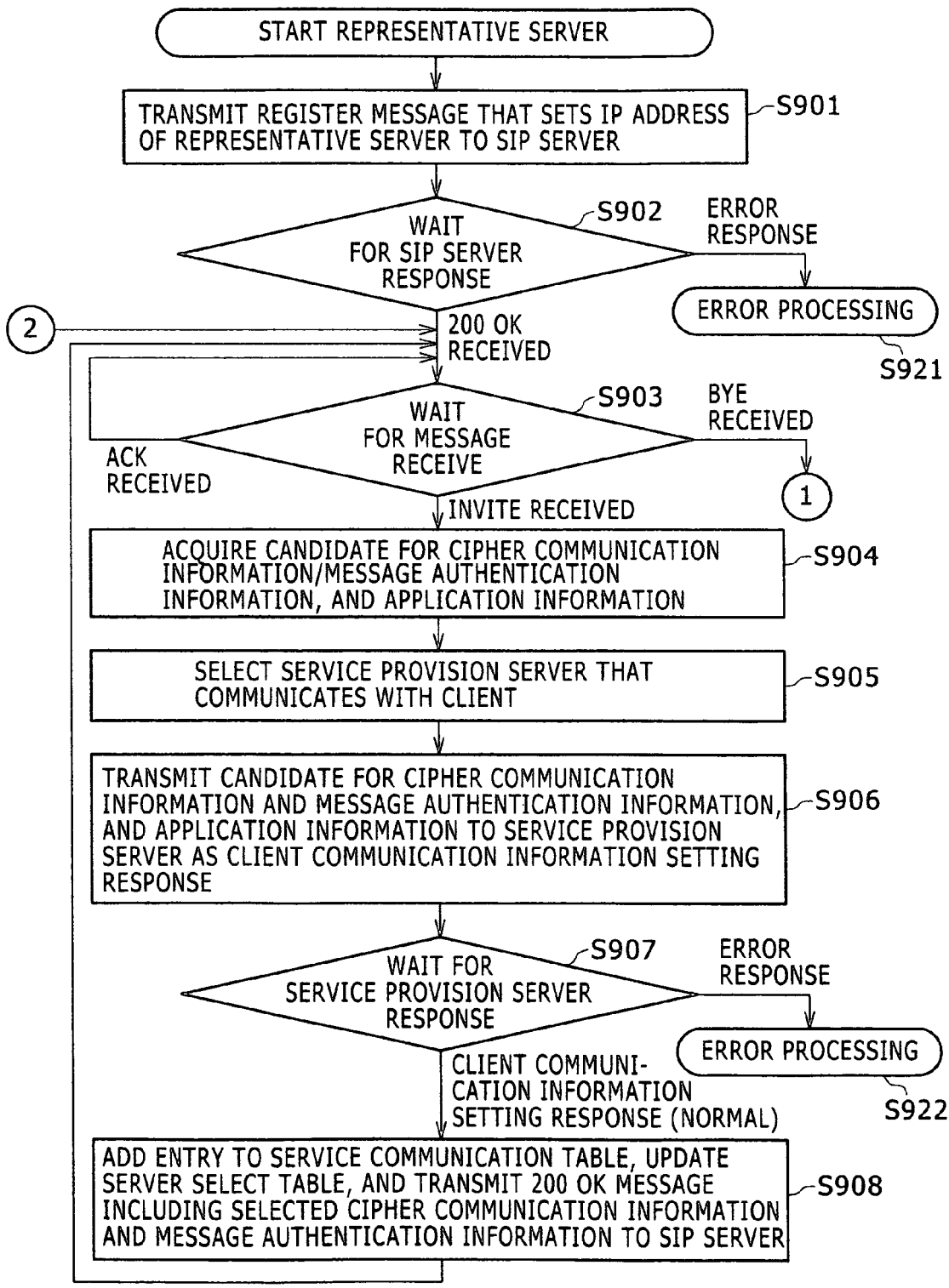
FIG. 26A is a flowchart showing the processing of a representative server according to a second embodiment (No. 1)
Figure 27:
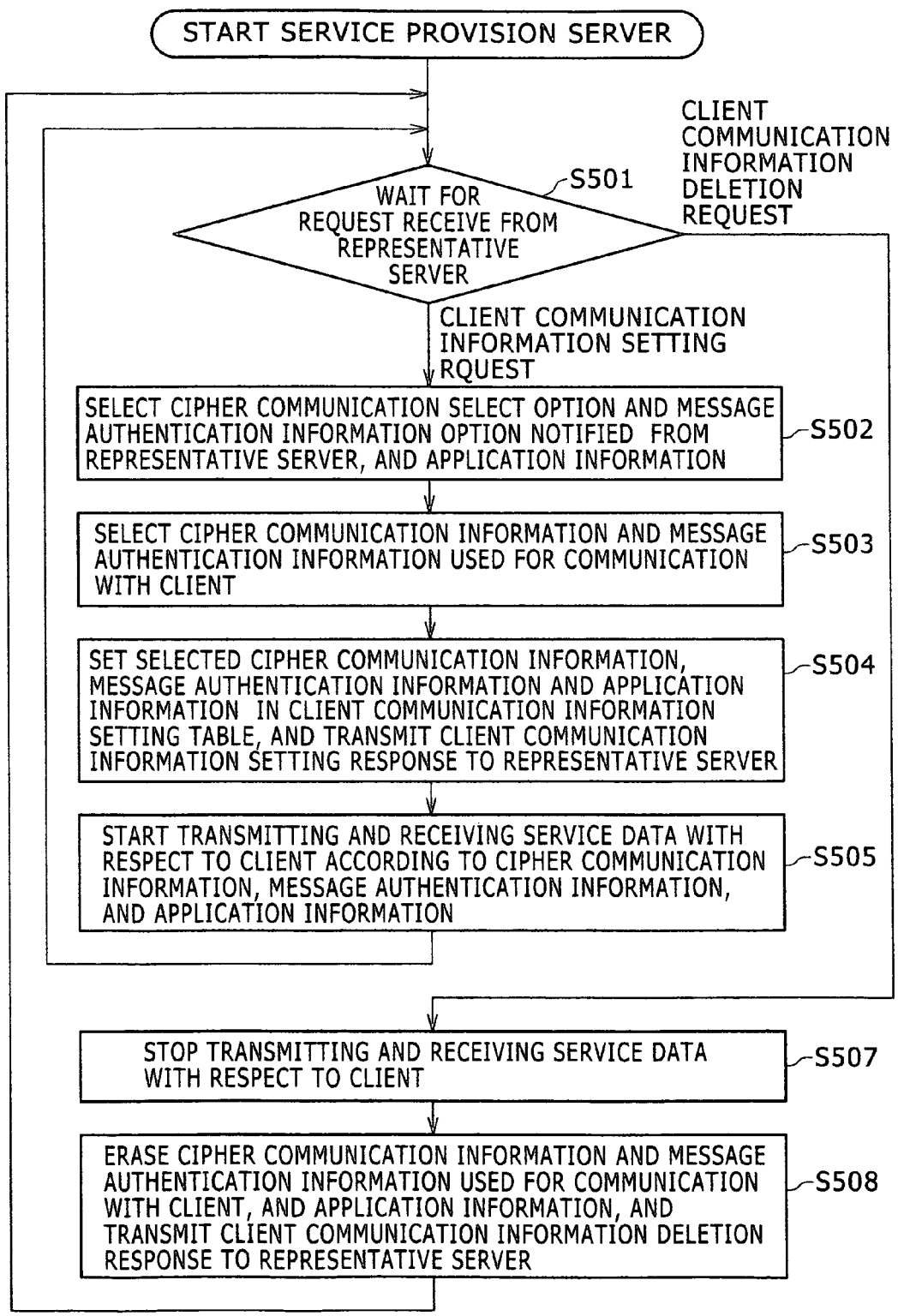
FIG. 27 is a flowchart showing the processing of a service provision server according to the second embodiment.
Figure 28:
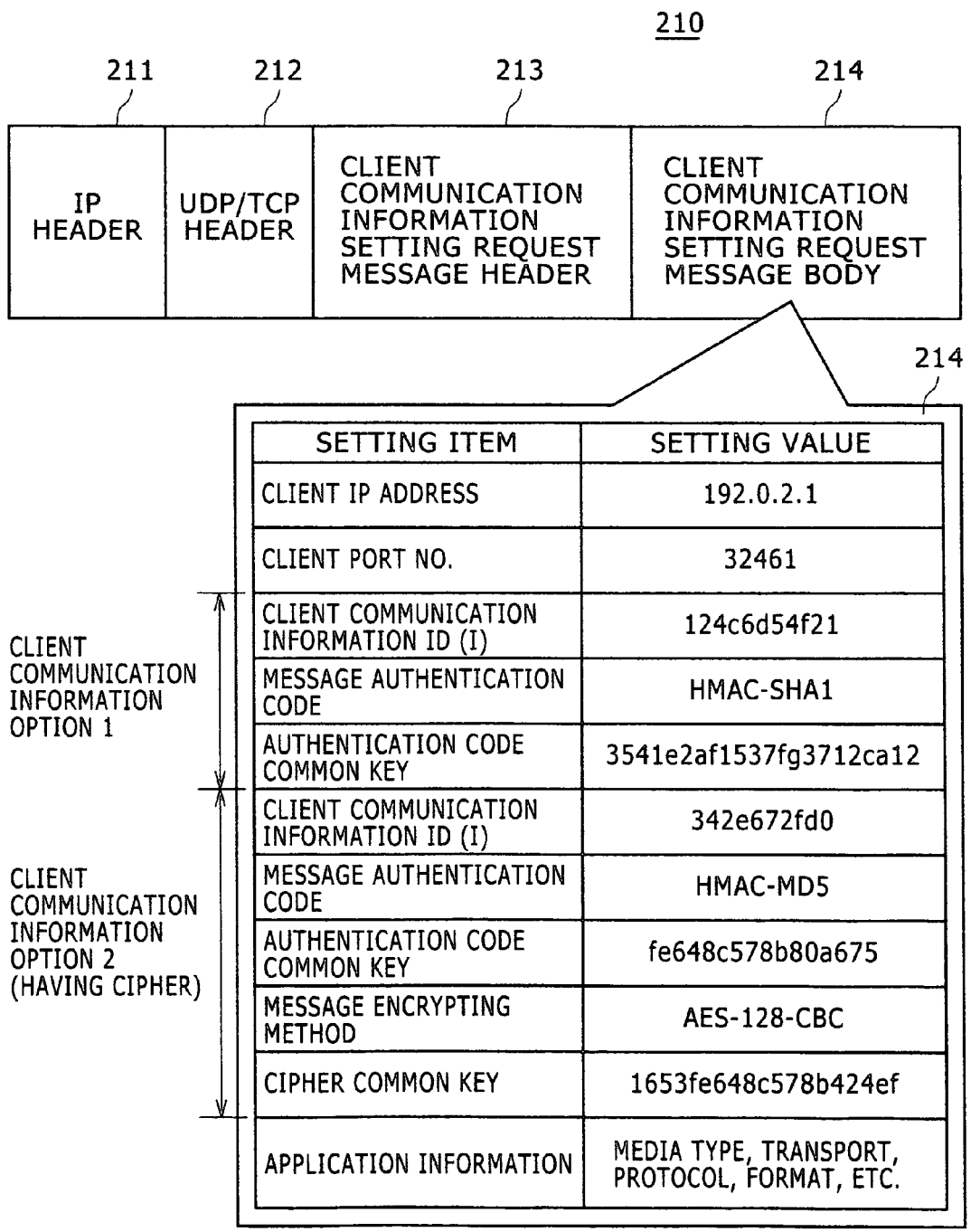
FIG. 28 is a diagram for explaining a configuration of a client communication information setting request addressed to the service provision server from the representative server and a message body according to the second embodiment.

A second embodiment of the present invention will be described with reference to FIGS. 26 to 29. In this example, FIGS. 26A and 26B are flowcharts showing the processing of a representative server. FIG. 27 is a flowchart showing the processing of a service provision server. FIG. 28 is a diagram for explaining a configuration of a client communication information setting request addressed to the service provision server from the representative server and a message body. FIG. 29 is a diagram for explaining a configuration of a client communication information setting response addressed to the representative server from the service provision server and a message body.

In the above-described first embodiment, the representative server selects the encrypted communication information and the message authentication information. On the contrary, in the second embodiment, the service provision server conducts the selection. In the second embodiment, only differences from the first embodiment will be described. Accordingly, most of the drawings are common to or substantially identical with those of the first embodiment with slight differences.

A processing flow of the representative server will be described with reference to FIGS. 26A and 26B. When the representative server 30 starts, the representative server 30 transmits a "REGISTER" message that sets its own IP address to the SIP server 20 as contact information (S901). After waiting a response from the SIP server 20 (S902), the representative server 30 receives "200 OK" and waits for message receive (S903). After having received "INVITE", the representative server 30 analyzes the INVITE message, and acquires a candidate for the encrypted communication information, a candidate for the message authentication information, and the application information (S904). The representative server 30 refers to a server selection table (FIG. 9) that records a status of the service provision server therein, and selects a service provision server that communicates with the client (S905).

The representative server 30 transmits a candidate for the encrypted communication information, a candidate for the message authentication information, and a application information to the service provision server as a client communication information setting request (S906). When a client communication information setting response which indicates that the normal communication has been conducted is returned from the service provision server 40-1 after the representative server 30 waits for a response from the service provision server 40-1 (S907), the representative server 30 adds an entry to the service connection table, and updates the server selection table. Also, the representative server 30 transmits a 200 OK message that includes the encrypted communication information and the message authentication information which has been selected by the service provision server 40-1 to the SIP server 20 (S908). Then, the representative server 30 again waits for the message receive (S903).

Upon receiving an ACK message from the SIP server 20 which is the service connection confirmation, the representative server 30 again waits for the message (S903). In this situation, upon receiving a BYE message which is a service disconnection request from the SIP server 20, the representative server 30 analyzes the BYE message, refers to the server selection table, and identifies the service provision server 40-1 that erases the encrypted communication information and the message authentication information (S911). Then, the representative server 30 transmits a client communication information deletion request to the identified service provision server 40-1 (9712), and waits for a response from the service provision server 40-1 (S913). When a client communication information deletion response which indicates that the normal communication has been conducted is returned from the service provision server 40-1, the representative server 30 deletes an entry of the service connection table, and updates the server selection table. Also, the representative server 30 transmits a 200 OK message which notifies the client of the erasing of the encrypted communication information and the message authentication information as well as the disconnection of the service to the SIP server 20 (S914), and waits for the message receive (S903). When the representative server 30 receives an error or times out in Step 902, 907, or 913, the representative server 30 transits to the error processing of Steps 921, 922, or 923.

Referring to FIG. 27, when the service provision server 40 starts, the service provision server 40 first waits for a request from the representative server 30 (S501). When the service provision server 40 receives a client communication information setting request, the service provision server 40 analyzes the client communication information setting request, and then acquires the encrypted communication information option, the message authentication information option, and the application information which are noticed from the representative server 30 (S502). The service provision server 40 selects the encrypted communication information and the message authentication information which are used for communication with the client (S503), sets the encrypted communication information, the message authentication information, and the application information in the client communication information setting table, and transmits a client communication information setting response to the representative server 30 (S504). Thereafter, the service provision server 40 starts to directly transmit and receive the service data with respect to the client according to the encrypted communication information, the message authentication information, and the application information (S505). This start allows the service provision server 40 to transit to the request receive wait status from the representative server 30 even while transmitting or receiving the service data (S501).

When the service provision server 40 receives a client communication information deletion request, the service provision server 40 analyzes the request, and stops transmitting and receiving the service data with respect to the client (S507). The service provision server 40 erases the encrypted communication information, the message authentication information, and the application information, which have been used for communication with the client from the client communication information setting table. Then, the service provision server 40 transmits a client communication information deletion response to the representative server 30 (S508), and again transits to the request receive wait from the representative server 30 (S501).

A client communication information setting request packet from the representative server to the service provision server as shown in FIG. 28 is a packet that is sent at a portion corresponding to T510 in FIG. 5. A client communication information setting request packet 210 is made up of an IP header 211, a UDP/TCP header 212, a client communication information setting request message header 213, and a client communication information setting request message body 214. In the second embodiment, the selection from the options submitted by the client is conducted by the service provision server 40-1. Accordingly, the client communication information setting request message body 214 is identical with the service connection request message body described with reference to FIG. 13.

A client communication information setting response packet from the service provision server to the representative server as shown in FIG. 29 is a packet that is sent at a portion corresponding to T511 in FIG. 5. A client communication information setting response packet 220 is made up of an IP header 221, a UDP/TCP header 222, a client communication information setting response message header 223, and a client communication information setting response message body 224. The client communication information setting response message body 224 is identical with the service connection response message body described with reference to FIG. 15.

According to this embodiment, because the authentication is conducted with respect to only the representative server, it is unnecessary that the service provision server has an electronic certificate. The client confirms a value of the HMAC that is given the message, thereby making it possible to confirm that the service provision server that conducts the communication is a service provision server under a correct representative server. Also, the encrypted communication makes it possible to keep the confidential property of service data.

It is unnecessary that the SIP server authenticates the individual service provision servers, and also it is unnecessary that the communication session is held between the SIP server and the individual service provision servers. As a result, the load of the SIP server can be reduced. Also, because the data communication is conducted directly between the client and the service provision server, the representative server does not become the bottle neck of processing.

According to the present invention, because the authentication is conducted with respect to only the representative server, it is unnecessary that the service provision server has an electronic certificate. It is unnecessary that the SIP server authenticates the individual service provision servers, and also it is unnecessary that the communication session is held between the SIP server and the individual service provision servers. As a result, the load of the SIP server can be reduced. Also, because the data communication is conducted directly between the client and the service provision server, the representative server does not become the bottle neck of processing.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A service network system, comprising:
a plurality of service provision servers that provide information services;
a session management server discrete from the plurality of service provision servers, that executes a communication protocol for establishing and disconnecting a session according to a request from a client; and
a representative server discrete from the plurality of service provision serves and the session management server, that is representative of the plurality of service provision servers and executes the communication protocol with respect to the session management server, wherein said representative server transmits a client address and first client communication information which are received from the client to a service provision server which is selected from the plurality of service provision servers, with the first client communication information having a key for setting up encrypted communication, said representative server transmits a service provision server address and second client communication information related to encryption which are received from the selected service provision server to the client, with the second client communication information having a key for setting up encrypted communication, and said selected service provision server and the client use the client address and the service provision server address provided by the representative server, to directly communicate with each other via encrypted communication set up using the first client communication information and the second client communication information provided by the representative server.

2. The service network system according to claim 1, wherein said client transmits a plurality of client information pieces toward the representative server, and said representative server selects client information from the plurality of client information pieces, and transmits the client information to the selected service provision server as the first client information.

3. The service network system according to claim 1, wherein said client transmits the first client communication information including the plurality of client information pieces toward the representative server, said representative server transmits the first client communication information to the selected service server, and said selected service provision server selects the client communication information from the first client communication information.

4. A service network system, comprising:

a plurality of service provision servers that provide information services;

a session management server discrete from the plurality of service provision servers, that executes a communication protocol for establishing and disconnecting a session according to a request from a client; and a representative server discrete from the plurality of service provision serves and the session management server, that is representative of the plurality of service provision servers and executes the communication protocol with respect to the session management server, wherein said representative server transfers a client Internet Protocol (IP) address and first client communication information which are received from the client for use by one of the service provision servers to communicate with the client, to a service provision server which is selected from the plurality of service provision servers, with the first client communication information having a key for setting up encrypted communication, said representative server transfers a service provision server IP address and second client communication information related to encryption which are received from the selected service provision server for use by the client to communicate with the service provision server to the client, with the second client communication information having a key for setting up encrypted communication, and said selected service provision server and the client use the client address and the service provision server address provided by the representative server, to directly communicate with each other via encrypted communication set up using the first client communication information and the second client communication information provided by the representative server.

* * * * *